(12) United States Patent
Williams

(10) Patent No.: US 7,891,426 B2
(45) Date of Patent: *Feb. 22, 2011

(54) HEAT EXCHANGER SYSTEM AND METHOD OF USE THEREOF AND WELL DRILLING EQUIPMENT COMPRISING SAME

(76) Inventor: John R. Williams, Georgetown, TX (US); Theresa J. Williams, legal representative, 505 W. 21st St., Georgetown, TX (US) 78626

( * ) Notice: Subject to any disclaimer, the term of this patent is extended or adjusted under 35 U.S.C. 154(b) by 0 days.

This patent is subject to a terminal disclaimer.

(21) Appl. No.: 12/799,005

(22) Filed: Apr. 15, 2010

(65) Prior Publication Data

US 2010/0218938 A1 Sep. 2, 2010

Related U.S. Application Data

(63) Continuation of application No. 12/069,113, filed on Feb. 7, 2008, now Pat. No. 7,762,320.

(60) Provisional application No. 60/966,280, filed on Aug. 27, 2007.

(51) Int. Cl.
*E21B 19/00* (2006.01)
*E21B 3/04* (2006.01)

(52) U.S. Cl. .................... 166/302; 166/84.2; 166/84.3; 175/195

(58) Field of Classification Search ............... 166/84.3, 166/84.2, 302; 175/195; 384/476; 184/6.21, 184/6.22, 5, 26
See application file for complete search history.

(56) References Cited

U.S. PATENT DOCUMENTS 7,073,467 B2 * 7/2006 Kanno et al. ............. 123/41.33
2006/0144622 A1 * 7/2006 Bailey et al. ................ 175/230

* cited by examiner

*Primary Examiner*—David J Bagnell
*Assistant Examiner*—Cathleen R Hutchins
(74) *Attorney, Agent, or Firm*—David O. Simmons

(57) ABSTRACT

A bearing cooling system comprises a bearing assembly, a heat exchanger, a coolant flow circuit apparatus and a lubricant flow circuit apparatus. The bearing assembly is configured for being removably seated within a well drilling head housing and for having a stripper rubber assembly attached thereto. The bearing assembly includes bearings and a lubricant flow path configured for allowing lubricant to be circulated through the bearings. The heat exchanger has a lubricant core portion and a coolant core portion, which are jointly configured for allowing heat transfer between respective fluids of the core portions. The coolant flow circuit apparatus is coupled to the coolant core portion and is configured for circulating coolant through the coolant core portion. The lubricant flow circuit apparatus is coupled to the lubricant core portion and lubricant flow path, and is configured for circulating lubricant through the coolant core portion and the lubricant flow path.

18 Claims, 18 Drawing Sheets

HEAT EXCHANGER SYSTEM AND METHOD OF USE THEREOF AND WELL DRILLING EQUIPMENT COMPRISING SAME

CROSS REFERENCE TO RELATED APPLICATIONS

This continuation patent application claims priority from U.S. patent application Ser. No. 12/069,113 filed Feb. 7, 2008 now U.S. Pat. No. 7,762,320, entitled "Heat Exchanger System And Well Drilling Equipment Comprising Same", which claims priority from co-pending U.S. Provisional Patent Application having Ser. No. 60/966,280 filed Aug. 27, 2007 entitled "Rotation control head, rotating blowout preventor and the like", both having a common applicant herewith and being incorporated herein in their entirety by reference.

FIELD OF THE DISCLOSURE

The disclosures made herein relate generally to equipment, systems and apparatuses relating to drilling of wells and, more particularly, to rotating control heads, rotating blowout preventors, and the like.

BACKGROUND

Oil, gas, water, geothermal wells and the like are typically drilled with a drill bit connected to a hollow drill string which is inserted into a well casing cemented in a well bore. A drilling head is attached to the well casing, wellhead or to associated blowout preventor equipment, for the purposes of sealing the interior of the well bore from the surface and facilitating forced circulation of drilling fluid through the well while drilling or diverting drilling fluids away from the well. Drilling fluids include, but are not limited to, water, steam, drilling muds, air, and other fluids (i.e., liquids, gases, etc).

In the forward circulation drilling technique, drilling fluid is pumped downwardly through the bore of the hollow drill string, out the bottom of the hollow drill string and then upwardly through the annulus defined by the drill string and the interior of the well casing, or well bore, and subsequently out through a side outlet above the well head. In reverse circulation, a pump impels drilling fluid through a port, down the annulus between the drill string and the well casing, or well bore, and then upwardly through the bore of the hollow drill string and out of the well.

Drilling heads typically include a stationary body, often referred to as a bowl, which carries a rotatable spindle, which is commonly referred to as a bearing assembly, rotated by a kelly apparatus or top drive unit. One or more seals or packing elements, often referred to as stripper packers or stripper rubber assemblies, is carried by the spindle to seal the periphery of the kelly or the drive tube or sections of the drill pipe, whichever may be passing through the spindle and the stripper rubber assembly, and thus confine or divert the core pressure in the well to prevent the drilling fluid from escaping between the rotating spindle and the drilling string.

As modern wells are drilled ever deeper, or into certain geological formations, very high temperatures and pressures may be encountered at the drilling head. These rigorous drilling conditions pose increased risks to rig personnel from accidental scalding, burns or contamination by steam, hot water and hot, caustic well fluids. There is a danger of serious injury to rig workers when heavy tools are used to connect a stripper rubber assembly to the drilling head. Accordingly, such a connection should be made quickly and achieve a fluid tight seal.

Rotation of respective rotating components of a rotating control head, rotating blowout preventor or other type of rotating control device is facilitated through a bearing assembly through which the drill string rotates relative to the stationary bowl or housing in which the bearing assembly is seated. Rotating control heads, rotating blowout preventors and other types of rotating control devices are generally referred to herein as well drilling heads. Typically, a rubber O-ring seal, or similar seal, is disposed between the stripper rubber assembly and the bearing assembly to improve the fluid-tight connection between the stripper rubber assembly and the bearing assembly. Pressure control is achieved by means of one or more stripper rubber assemblies connected to the bearing assembly and compressively engaged around the drill string. At least one stripper rubber assembly rotates with the drill string. A body of a stripper rubber assembly (i.e., a stripper rubber body) typically taper downward and include rubber or other resilient substrate so that the downhole pressure pushes up on the stripper rubber body, pressing the stripper rubber body against the drill string to achieve a fluid-tight seal. Stripper rubber assemblies often further include a metal insert that provide support for bolts or other attachment means and which also provide a support structure to minimize deformation of the rubber cause by down hole pressure forces acting on the stripper rubber body.

Stripper rubber assemblies are connected or adapted to equipment of the drilling head to establish and maintain a pressure control seal around the drill string (i.e., a down hole tubular). It will be understood by those skilled in the art that a variety of means are used to attach a stripper rubber assembly to associated drilling head equipment. Such attachment means include bolting from the top, bolting from the bottom, screwing the stripper rubber assembly directly onto the equipment via cooperating threaded portions on the top of the stripper rubber assembly and the bottom of the equipment, clamps and other approaches.

It will be understood that, depending on the particular equipment being used at a drilling head, a stripper rubber assembly at one well may be connected to equipment specific to that well while at another well a stripper rubber assembly is connected to different equipment. For example, at one well the stripper rubber assembly may be connected to the bearing assembly while at another well the stripper rubber assembly may be connected to an inner barrel or an accessory of the drilling head. Thus, the stripper rubber assembly is not unnecessarily limited to being connected to a particular component of a rotating control head, rotating blowout preventor or the like.

It is common practice to tighten the bolts or screws of the connection with heavy wrenches and sledge hammers. The practice of using heavy tools to tighten a bolt, for example, can result in over-tightening, to the point where the threads or the bolt head become stripped. The results of over-tightening include stripped heads, where the bolt or screw cannot be removed, or stripped threads, where the bolt or screw has no grip and the connection fails. Both results are undesirable. Even worse, vibration and other drilling stresses can cause bolts or screws to work themselves loose and fall out. If one or more falls downhole, the result can be catastrophic. The drill bit can be ruined. The entire drillstring may have to tripped out, and substantial portions replaced, including the drill bit. If the well bore has been cased, the casing may be damaged and have to be repaired.

Drilling head assemblies periodically need to be disassembled to replace stripper rubber assemblies or other parts, lubricate moving elements and perform other recommended maintenance. In some circumstances, stripped or over tightened bolts or screws make it very difficult if not impossible to disengage the stripper rubber assembly from the drilling head assembly to perform recommended maintenance or parts replacement.

One prior art rotating control head configuration that is widely used rotating control heads in the oil field industry is the subject of U.S. Pat. No. 5,662,181 to John R. Williams (i.e., the Williams '181 patent). The Williams '181 patent relates to drilling heads and blowout preventors for oil and gas wells and more particularly, to a rotating blowout preventor mounted on the wellhead or on primary blowout preventors bolted to the wellhead, to pressure-seal the interior of the well casing and permit forced circulation of drilling fluid through the well during drilling operations. The rotating blowout preventor of the Williams '181 patent includes a housing which is designed to receive a blowout preventor bearing assembly and a hydraulic cylinder-operated clamp mechanism for removably securing the bearing assembly in the housing and providing ready access to the components of the bearing assembly and dual stripper rubber assemblies provided in the bearing assembly. A conventional drilling string is inserted or "stabbed" through the blowout preventor bearing assembly, including the two base stripper rubber assemblies rotatably mounted in the blowout preventor bearing assembly, to seal the drilling string. The device is designed such that chilled water and/or antifreeze may be circulated through a top pressure seal packing box in the blowout preventor bearing assembly and lubricant is introduced into the top pressure seal packing box for lubricating top and bottom pressure seals, as well as stacked radial and thrust bearings.

Primary features of the rotating blowout preventor of the Williams '181 patent include the circulation of chilled water and/or antifreeze into the top seal packing box and using a hydraulically-operated clamp to secure the blowout preventor bearing assembly in the stationary housing, to both cool the pressure seals and provide access to the spaced rotating stripper rubber assemblies and internal bearing assembly components, respectively. The clamp can be utilized to facilitate rapid assembly and disassembly of the rotating blowout preventor. Another primary feature is mounting of the dual stripper rubber assemblies in the blowout preventor bearing assembly on the fixed housing to facilitate superior sealing of the stripper rubber assemblies on the kelly or drilling string during drilling or other well operations. Still another important feature is lubrication of the respective seals and bearings and offsetting well pressure on key shaft pressure seals by introducing the lubricant under pressure into the bearing assembly top pressure seal packing box.

Objects of a rotating blowout preventor in accordance with the Williams '181 patent include a blowout preventor bearing assembly seated on a housing gasket in a fixed housing, a hydraulically-operated clamp mechanism mounted on the fixed housing and engaging the bearing assembly in mounted configuration, which housing is attached to the well casing, wellhead or primary blowout preventor, a vertical inner barrel rotatably mounted in the bearing assembly and receiving a pair of pressure-sealing stripper rubber assemblies and cooling fluid and lubricating inlet ports communicating with top pressure seals for circulating chilled water and/or antifreeze through the top seals and forcing lubricant into stacked shaft bearings and seals to exert internal pressure on the seals and especially, the lower seals.

Specific drawbacks of prior art rotating control head, rotating blowout preventor and/or the like (including a rotating blowout preventor/or rotating control head in accordance with the Williams '181 patent) include, but are not limited to, a.) relying on or using curved clamp segments that at least partially and jointly encircle the housing and bearing assembly; b.) relying on or using clamp segments that are pivotably attached to each other for allowing engagement with and disengagement from the bearing assembly; c.) relying on or using hydraulic clamp(s); d.) relying on or using a mechanical bolt-type connection to back-up a hydraulic clamp for insuring safe operation; e.) poor sealing from environmental contamination at various interface; f.) cumbersome and ineffective stripper rubber assembly attachment; g.) lack or inadequate cooling at key heat sensitive locations of the inner barrel and/or bowl; h.) lack of real-time and/or remotely monitored data acquisition functionality (e.g., via wireless/satellite uploading of data); i.) static (e.g., non-self adjusting) barrel assembly bearing preloading; and j.) cumbersome/ineffective lubrication distribution and cooling.

Therefore, a rotating control head, rotating blowout preventor and/or the like that overcomes abovementioned and other known and yet to be discovered drawbacks associated with prior art oil field drilling equipment (e.g., rotating control head, rotating blowout preventor and/or the like) would be advantageous, desirable and useful.

SUMMARY OF THE DISCLOSURE

Embodiments of the present invention overcome one or more drawback of prior art rotating control head, rotating blowout preventor and/or the like. Examples of such drawbacks include, but are not limited to, a.) relying on or using curved clamp segments that at least partially and jointly encircle the housing and bearing assembly; b.) relying on or using clamp segments that are pivotably attached to each other for allowing engagement with and disengagement from the bearing assembly; c.) relying on or using hydraulic clamp (s); d.) relying on or using a mechanical bolt-type connection to back-up a hydraulic clamp for insuring safe operation; e.) poor sealing from environmental contamination at various interface; f.) cumbersome and ineffective stripper rubber assembly attachment; g.) lack or inadequate cooling at key heat sensitive locations of the inner barrel and/or bowl; h.) lack of real-time and/or remotely monitored data acquisition functionality (e.g., via wireless/satellite uploading of data); i.) static (e.g., non-self adjusting) barrel assembly bearing preloading; and j.) cumbersome/ineffective lubrication distribution and cooling. In this manner, embodiments of the present invention provide an advantageous, desirable and useful implementation of one or more aspects of a rotating control head, blowout preventor or other type of oil field equipment.

In one embodiment of the present invention, a bearing cooling system comprises a bearing assembly, a heat exchanger, a coolant flow circuit apparatus and a lubricant flow circuit apparatus. The bearing assembly is configured for being removably seated within a well drilling head housing and for having a stripper rubber assembly attached thereto. The bearing assembly includes a plurality of bearings and a lubricant flow path configured for allowing lubricant to be circulated through the bearings. The heat exchanger has a lubricant core portion and a coolant core portion. The core portions are jointly configured for allowing heat transfer between respective fluids of the core portions. The coolant flow circuit apparatus is coupled to the coolant core portion and is configured for circulating coolant through the coolant core portion. The lubricant flow circuit apparatus is coupled to the lubricant core portion and to the lubricant flow path, and is configured for circulating lubricant through the coolant core portion and the lubricant flow path.

In another embodiment of the present invention, a well drilling head system comprises a well drilling head housing, a bearing assembly, a heat exchanger, a coolant flow circuit apparatus and a lubricant flow circuit apparatus. The well drilling head housing has a sidewall structure defining a central bore. The bearing assembly is configured for being removably seated within the well drilling head housing and for having a stripper rubber assembly attached thereto. The bearing assembly includes a plurality of bearings and a lubricant flow path configured for allowing lubricant to be circulated through the bearings. The heat exchanger has a lubricant core portion and a coolant core portion. The core portions are jointly configured for allowing heat transfer between respective fluids of the core portions. The coolant flow circuit apparatus is coupled to the coolant core portion and is configured for circulating coolant through the coolant core portion. The lubricant flow circuit apparatus is coupled to the lubricant core portion and to the lubricant flow path, and is configured for circulating lubricant through the coolant core portion and the lubricant flow path.

In another embodiment of the present invention, a method includes an operation for circulating coolant through a coolant flow circuit of a heat exchanger system of a well drilling head and for circulating lubricant through a lubricant flow circuit of the heat exchanger system. Circulating the coolant includes causing the coolant to flow from a coolant pump through a coolant core portion of a heat exchanger and through a heat dissipating device after flowing through the coolant core portion of the heat exchanger radiator. Circulating the lubricant includes causing the lubricant to flow from a lubricant pump through bearings of a well drilling head bearing assembly and through a lubricate core portion of the heat exchanger after flowing through the bearings. The core portions are jointly configured for causing heat transfer between the coolant and the lubricant.

These and other objects, embodiments, advantages and/or distinctions of the present invention will become readily apparent upon further review of the following specification, associated drawings and appended claims. Furthermore, it should be understood that the inventive aspects of the present invention can be applied to rotating control heads, rotating blowout preventors and the like. Thus, in relation to describing configuration and implementation of specific aspects of the present invention, the terms rotating control head and rotating blowout preventors can be used interchangeable as both are oil well drilling equipment that provides functionality that will benefit from the present invention.

DETAILED DESCRIPTION OF THE DRAWING FIGURES

Figure 1:
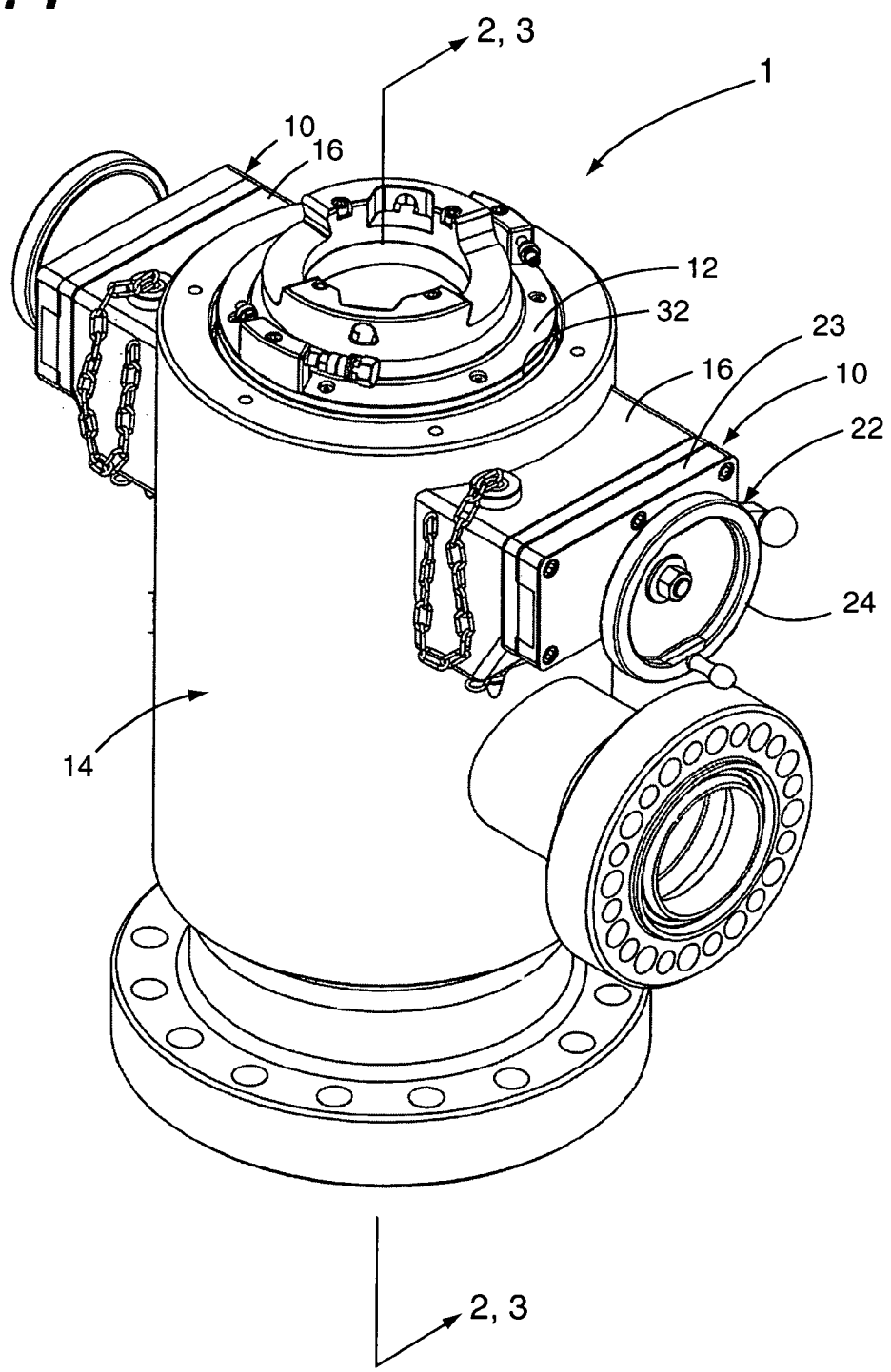
FIG. 1 is a perspective view of a rotating control head in accordance with a first embodiment of the present invention, wherein the rotating control head includes a ram-style bearing assembly retaining apparatus in accordance with the present invention.
Figure 2:
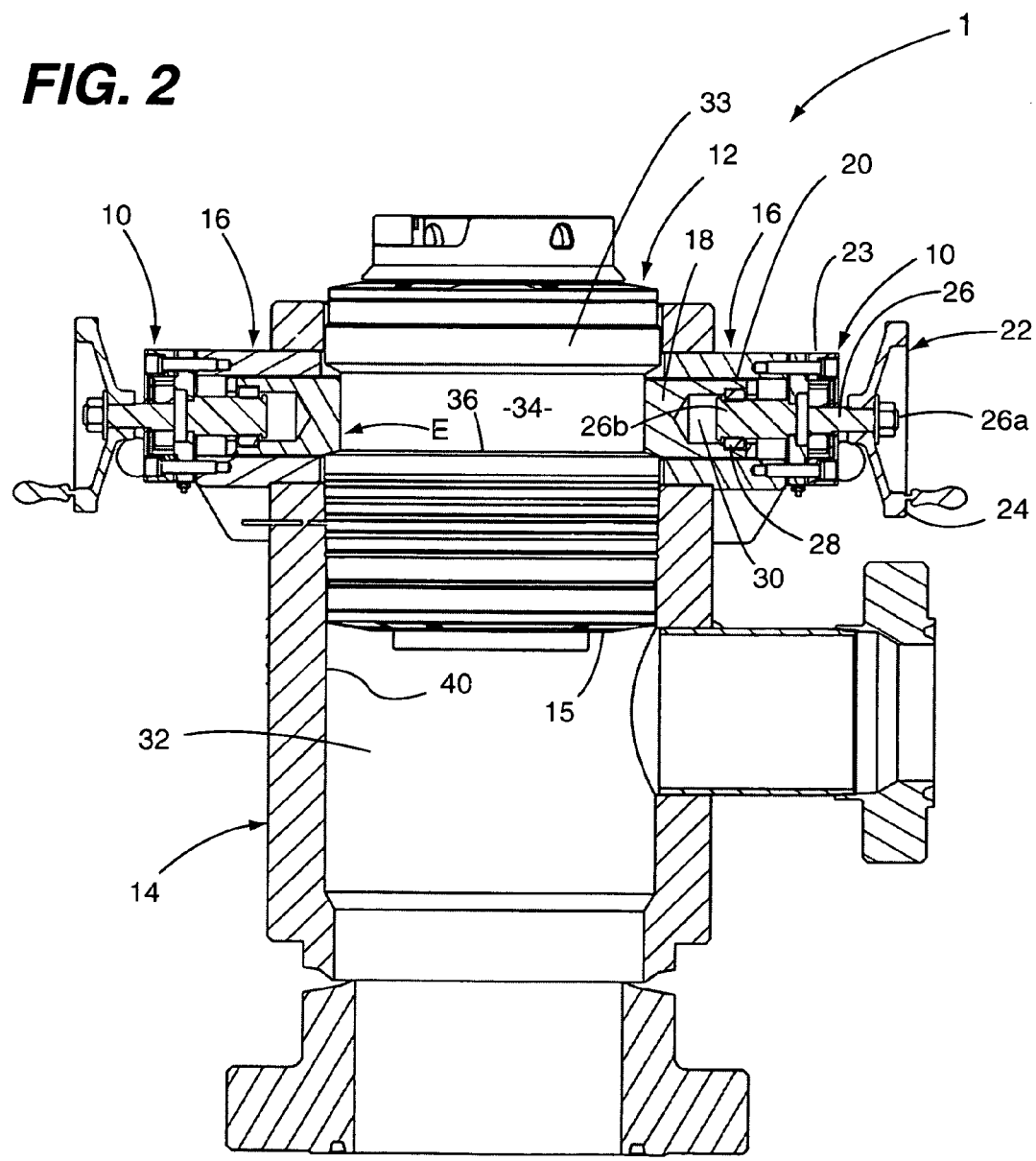
FIG. 2 is a cross-sectional view taken along the line 2-2 in FIG. 1, showing the ram-style bearing assembly retaining apparatus engaged with the bearing assembly.
Figure 3:
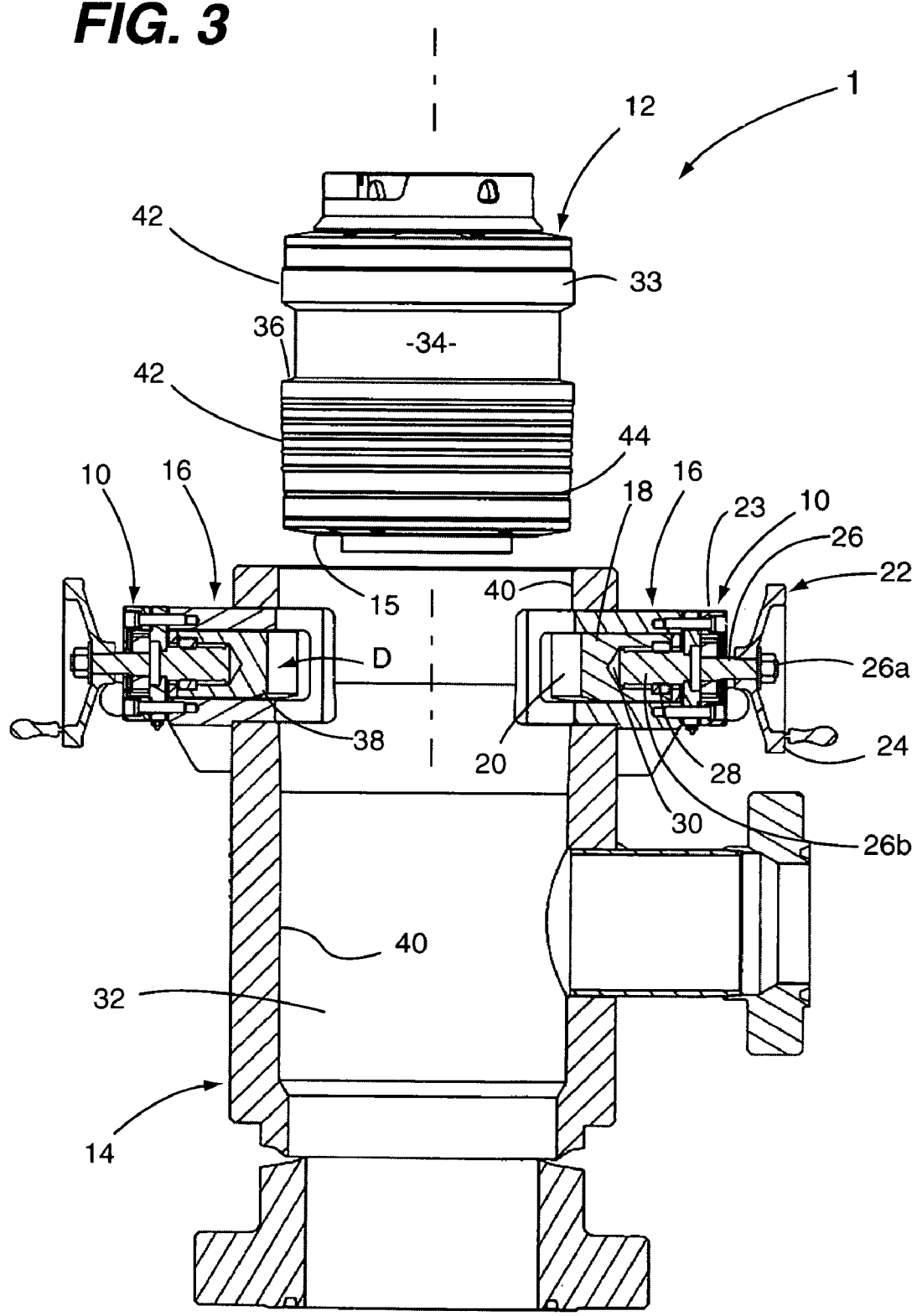
FIG. 3 is a cross-sectional view taken along the line 3-3 in FIG. 1, showing the ram-style bearing assembly retaining apparatus disengaged and the bearing assembly in a removed position with respect to a bowl of the rotating control head.

FIGS. 1-3 show various aspects of a rotating control head 1 in accordance with a first embodiment of the present invention. The rotating control head 1 is commonly referred to as a low pressure rotating control head. As illustrated in FIGS. 1-3, it can be seen that an underlying distinction between a ram-style retaining apparatus in accordance with the present invention and prior art bearing assembly retaining apparatuses is that the ram-style retaining apparatus utilizes a plurality of angularly spaced apart ram assemblies 10 to retain a bearing assembly 12 in a fixed position with respect to an equipment housing 14 (i.e., commonly referred to in the art as a bowl). An inner barrel 15 of the bearing assembly 12 is configured for having a stripper rubber assembly attached to an end portion thereof. As shown, two ram assemblies angularly spaced by approximately 180-degrees are provided for retain the bearing assembly 12 in the fixed position with respect to the equipment housing 14. However, a ram-style retaining apparatus in accordance with the present invention is not limited to two ram assemblies. Clearly, a ram-style retaining apparatus in accordance with the present invention having more than two ram assemblies or, conceivably, only one ram assembly can be implemented.

Each ram assembly 10 is fixedly mounted on a respective receiver 16 of the equipment housing 14 and, as shown in FIGS. 2 and 3, includes a ram 18 slideably disposed within a bore 20 of the respective receiver 16. Each ram assembly 10 includes a selective displacement means 22 coupled between a mounting plate 23 of the ram assembly 10 and the ram 18. The mounting plate 23 is fixedly attached to the respective receiver 16. Operation of the selective displacement means 22 allows a position of the ram 18 within the bore 20 to be selectively varied. In this manner, the selective displacement means 22 allows the ram 18 to be selectively moved between an engagement position E (FIG. 2) and a disengagement position D (FIG. 3).

As illustrated, each selective displacement means 22 includes a hand-operated crank 24, drive axle 26 and interlock member 28. The drive axle 26 is rotatable mounted on the respective mounting plate 23 in a manner that effectively precludes longitudinal displacement of the drive axle 26 with respect to the mounting plate 23. The hand-operated crank 24 is fixedly attached to a first end 26a of the drive axle 26 such that rotation of the crank 24 causes rotation of the drive axle 26. A second end 26b of the drive axle 26 is in threaded engagement with the interlock member 28. The interlock member 28 is retained within a central bore 30 of the ram 18 in a manner that limits, if not precludes, its rotation and translation with respect to the ram 18. Accordingly, rotation of the drive axle 26 causes a corresponding translation of the ram 18, thereby allowing selective translation of the ram 18 between the engagement position E and a disengagement position D.

Referring to FIG. 3, the equipment housing 14 includes a central bore 32 that is configured for receiving the bearing assembly 12. An outer barrel 33 of the bearing assembly 12 includes a circumferential recess 34 that defines an angled ram engagement face 36. Each ram 18 includes an angled barrel engagement face 38. An inside face 40 of the equipment housing central bore 32 and an outer face 42 of the outer barrel 33 are respectively tapered (e.g., a 2-degree taper) for providing a tapered interface between the outer barrel 33 and the equipment housing 14 when the bearing assembly 12 is seated in the equipment housing central bore 32. A plurality of seal-receiving grooves 44 are provided in the outer face 42 of the outer barrel 33 for allowing seals (e.g., O-ring seals) to provide a respective fluid-resistant seal between the outer barrel 33 and the equipment housing 14. In one embodiment, the tapered inside face 40 of the equipment housing central bore 32 is carried by a replaceable wear sleeve. The replaceable wear sleeve can be removed and replaces as needed for addressing wear and routine maintenance.

In operation, the bearing assembly 12 is lowered into the equipment housing central bore 32 of the equipment housing 14 with the rams 18 in their respective disengaged position D. Through rotation of the respective crank 24 in a first rotational direction, each ram 18 is moved from its disengaged position D to its engaged position E. In its engaged position E, the angled barrel engagement face 38 of each ram 18 is engaged with the angled ram engagement face 36 of the outer barrel 33. Through such engagement of the angled barrel engagement face 38 of each ram 18 with the angled ram engagement face 36 of the outer barrel 33, the outer face 42 of the outer barrel 33 is biased against the inside face 40 of the equipment housing central bore 32. Rotation of the cranks 24 in a second rotational direction causes the rams 18 to move from their respective engaged position E to their respective disengaged position D, thereby allows the bearing assembly 12 to be removed from within the equipment housing central bore 32.

Various aspects of the ram-style retaining apparatus illustrated in FIGS. 1-3 can be altered without departing from the underlying intent and functionality of a ram-style retaining apparatus in accordance with the present invention. One example of such alteration is for the hand-operated crank 24 can be replaced with an electric, pneumatic or hydraulic motor arrangement for allowing motor-driven rotation of the drive axle 26. Another example of such alteration is for the hand-operated crank 24 to be replaced with a non-manual device. One example of such alteration is for the hand-operated crank 24, drive axle 26 and interlock member 28 to be replaced with a linear motion arrangement such as a hydraulic or pneumatic ram apparatus. Still another example of such alteration is for a discrete locking arrangement to be provided for securing a respective ram 18 in its engaged position to limit the potential for unintentional movement of the ram 18 toward its disengaged position. Yet another example of such alteration is for the angled ram engagement face 36 and the angled barrel engagement face 38 to be replaced with non-tapered faces (e.g., curved faces) that provide the same biasing functionality when such faces are brought into engagement with each other. And still a further example of such alteration in the optional inclusion of a means such as, for example, a pilot actuated valve circuit that prevents movement of the rams 18 from the engaged position toward the disengaged position (e.g., by preventing release and/or application of pressure to a ram cylinder or pump).

As can be seen, a ram-style retaining apparatus in accordance with an embodiment of the present invention offers a number of advantages over clamp-style retaining apparatuses for retaining a bearing assembly within a housing of oil field equipment. Examples of such advantages include, but are not limited to, the apparatus offering ease of engagement and disengagement, the apparatus being self-supported on the housing of the oil field equipment, and the apparatus positively biasing the bearing assembly into a seated position with respect to the housing and/or mating seal(s).

FIGS. 4-12 show various aspects of a rotating control head 100 in accordance with a second embodiment of the present invention. The configuration and operability of the rotating control head 100 is generally the same as the configuration and operability of the rotating control head 1 shown in FIGS. 1-3. Accordingly, the reader is directed to the disclosures relating to refer to FIGS. 1-3 for details relating to the configuration and operability of the rotating control head 100.

The rotating control head 100 is commonly referred to as a low pressure rotating control head. As shown, the rotating control head 100 includes a plurality of angularly spaced apart ram assemblies 110 to retain a bearing assembly 112 in a fixed position with respect to an equipment housing 114 (i.e., commonly referred to in the art as a bowl) that are substantially the same as that illustrated in FIGS. 1-3. The bearing assembly 112 is removably mounted within a bore 115 of the equipment housing 114.

Figure 4:
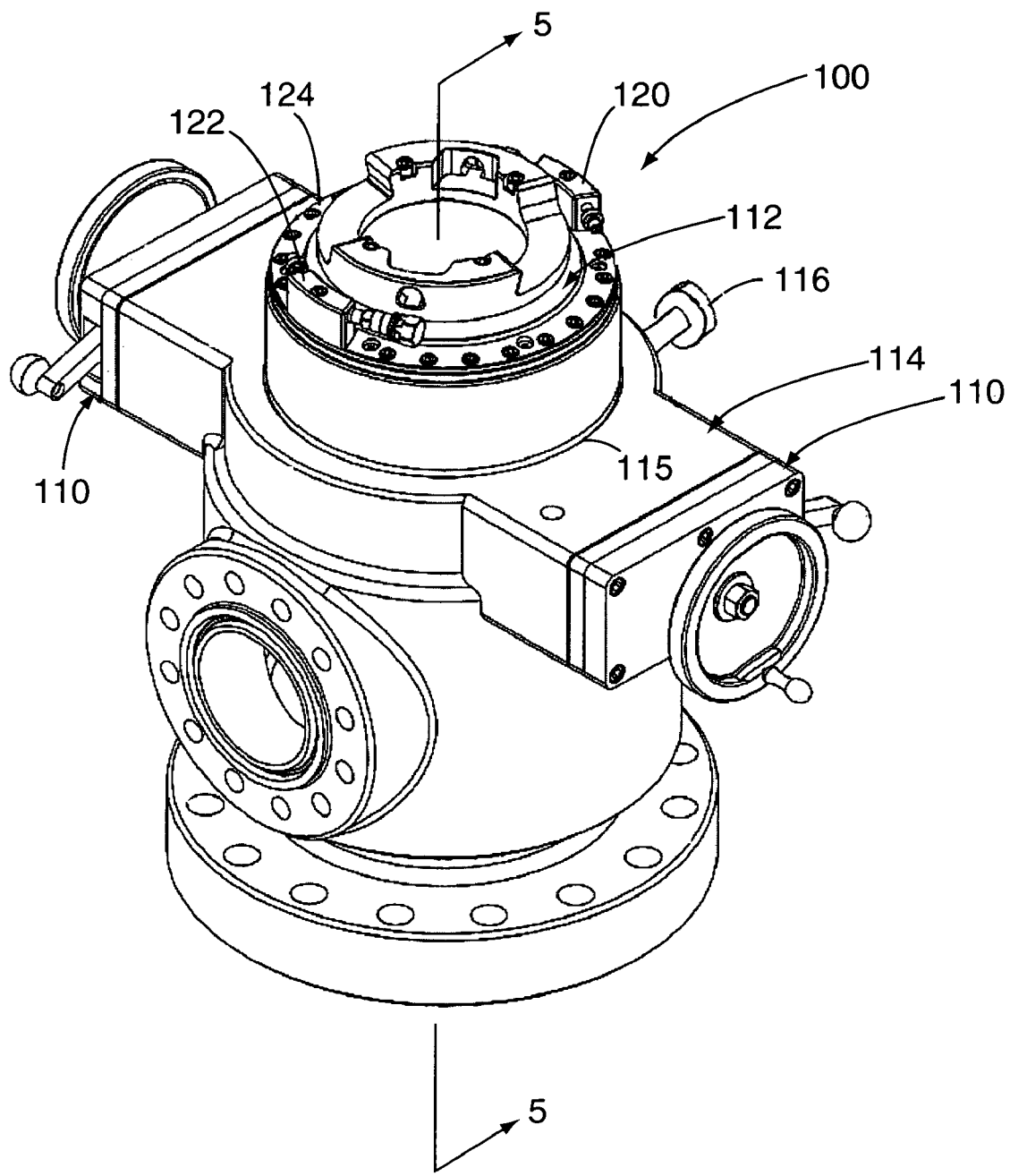
FIG. 4 is a perspective view of a rotating control head in accordance with a second embodiment of the present invention, wherein the rotating control head includes a ram-style bearing assembly retaining apparatus in accordance with the present invention.

As shown in FIG. 4, a pressure gauge 116 can be mounted on equipment housing 114 in a manner for allowing well pressure to be monitored. It is disclosed herein that the pressure gauge 116 can be an electronic gauge having a transducer with an output interface for allowing remote electronic monitoring, recording, and/or analysis of the well pressure.

As Referring now to FIGS. 4-8, a first lubricant distribution manifold 120 and a second lubricant distribution manifold 122 can be mounted on a cover plate 124 of the bearing assembly 112. The lubricant distribution manifolds 120, 122 are engaged with a top portion of an outer barrel 126 of the bearing assembly 112. The first lubricant distribution manifold 120 is angularly spaced apart from the second lubricant distribution manifold 122 (e.g., by 180-degrees). The first lubricant distribution manifold 120 includes a first seal lubricant coupler 120a, a first seal lubricant passage 120b, a first bearing lubricant coupler 120c and a first bearing lubricant passage 120d. The second lubricant distribution manifold 122 includes a second seal lubricant coupler 122a, a second seal lubricant passage 122b, a second bearing lubricant coupler 122c and a second bearing lubricant passage 122d. The first seal lubricant coupler 120a is communicative with the first seal lubricant passage 120b for allowing the flow of seal lubricant therebetween and the first bearing lubricant coupler 120c is communicative with the first bearing lubricant passage 120d for allowing flow of bearing lubricant therebetween. The second seal lubricant coupler 122a is communicative with the second seal lubricant passage 122b for allowing the flow of seal lubricant therebetween and the second bearing lubricant coupler 122c is communicative with the second bearing lubricant passage 122d for allowing flow of bearing lubricant therebetween. Preferably, but not necessarily, the lubricant couplers 120a, 122a, 120c and 122c are quick disconnecting type couplers, the seal lubricant couplers 120a, 120c are a first configuration (e.g., size) and the bearing lubricant couplers 122a, 122c are a second configuration different than the first configuration.

Figure 7:
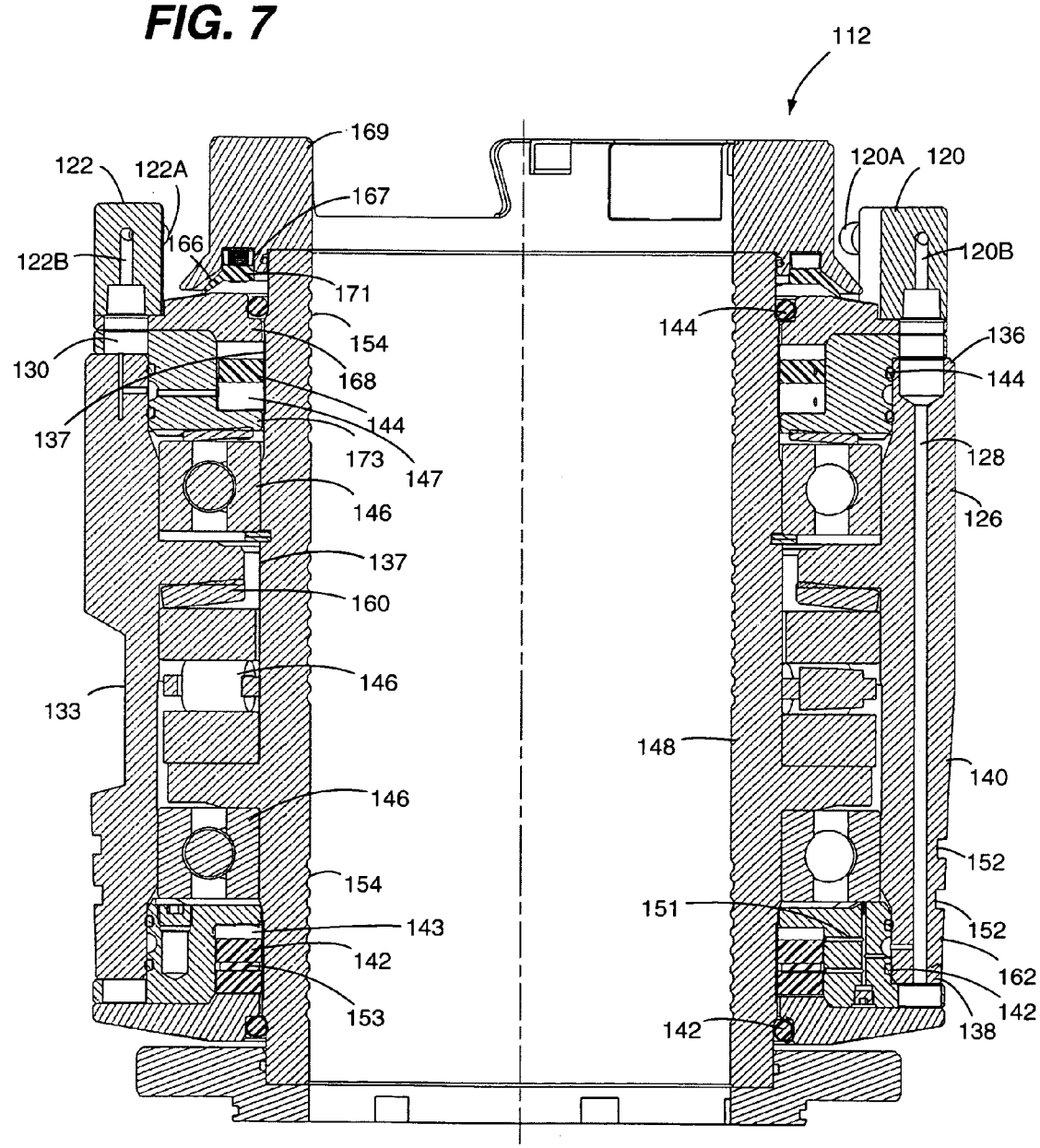
FIG. 7 is a cross-sectional view taken along the line 7-7 in FIG. 6, showing a seal lubrication arrangement of the bearing assembly.
Figure 8:
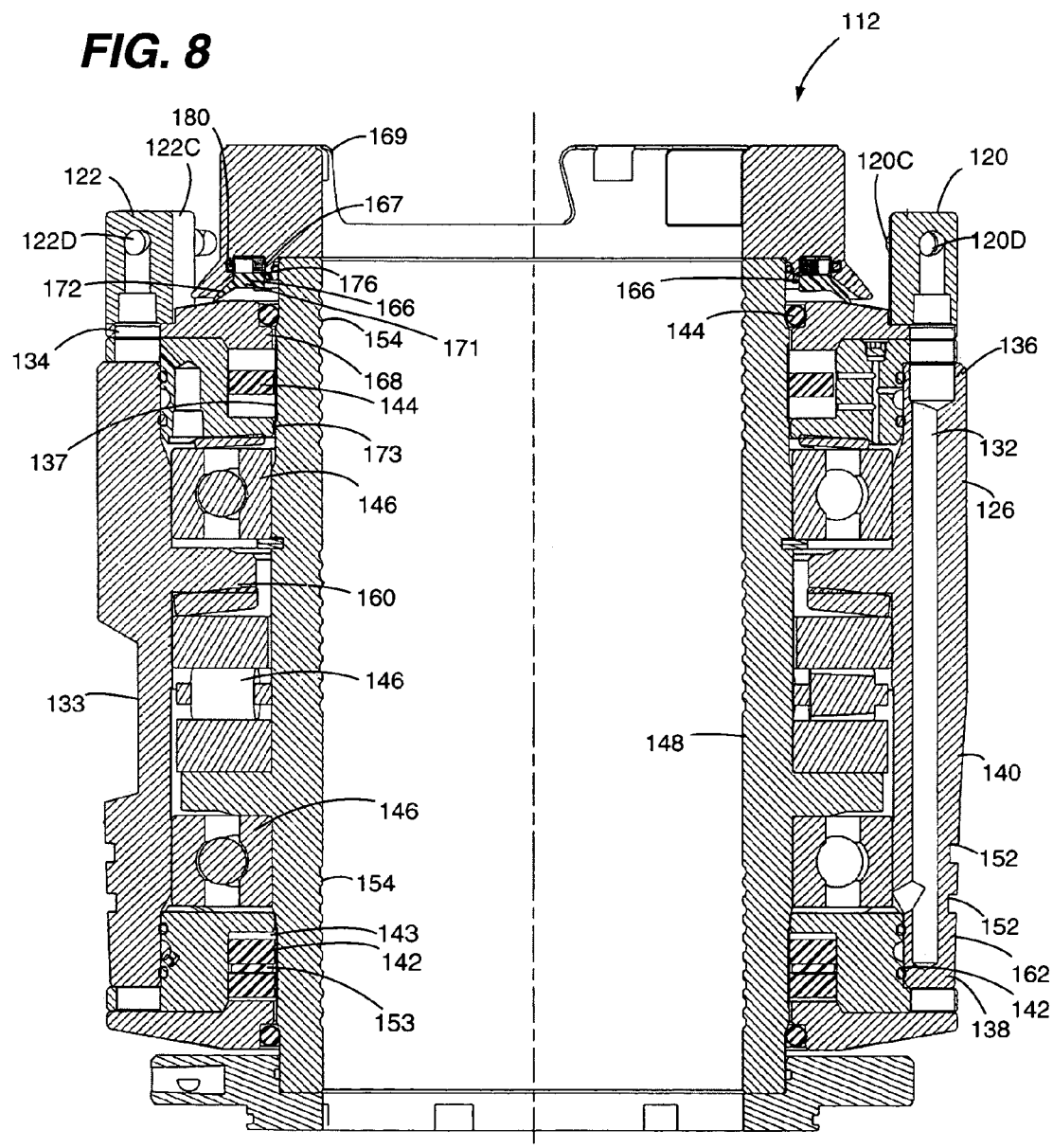
FIG. 8 is a cross-sectional view taken along the line 8-8 in FIG. 6, showing a bearing lubrication arrangement of the bearing assembly.

As shown in FIG. 7, the first seal lubricant passage 120b of the first lubricant distribution manifold 120 is communicative with a first seal lubricant channel 128 within the outer barrel 126 and the second seal lubricant passage 122b of the second lubricant distribution manifold 122 is communicative with a first seal lubricant channel 130 within the outer barrel 126. Similarly, as shown in FIG. 8, the first bearing lubricant passage 120d of the first lubricant distribution manifold 120 is communicative with a first bearing lubricant channel 132 within the outer barrel 126 and the second bearing lubricant passage 122d of the second lubricant distribution manifold 122 is communicative with a second bearing lubricant channel 134 within the outer barrel 126.

Figure 6:
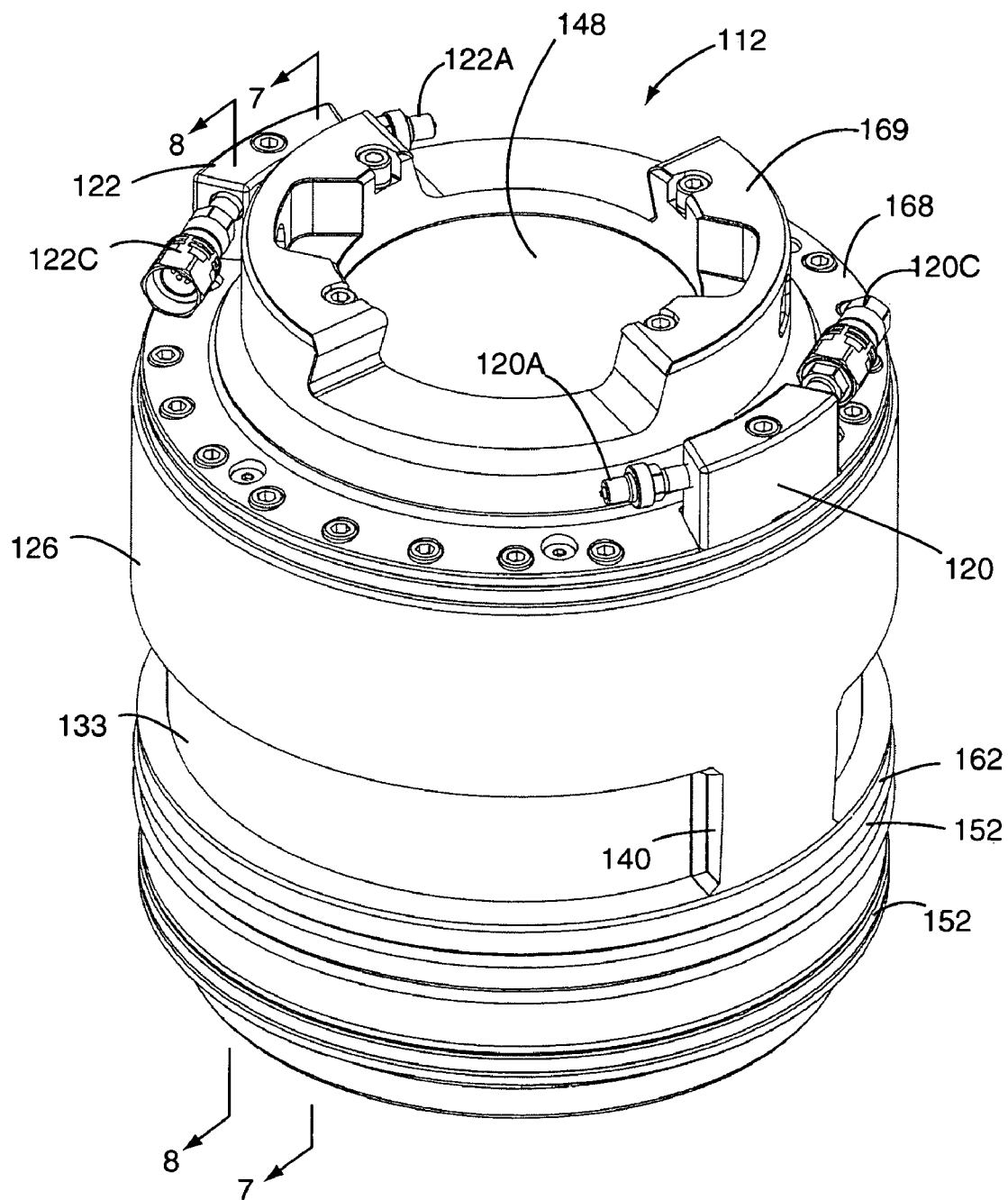
FIG. 6 is a perspective view of a bearing assembly of the rotating control head of FIG. 5.

The first seal lubricant channel 128 and the first bearing lubricant channel 132 extend from an upper end portion 136 of the outer barrel 126 to a lower end portion 138 of the outer barrel 126 through a key portion 140 of the outer barrel 126 (FIG. 6). The key portion 140 is a raised body that intersects a circumferential ram receiving recess 133 of the outer barrel 126. Through contact with a ram of a ram assembly, the key portion 140 provides for anti-rotation of the outer barrel 126 when mounted within the equipment housing 114 in addition to lubricant flow being routed therethrough.

Lubricant provided to the first seal lubricant channel 128 via the first lubricant manifold 120 serves to lubricate one or more lower seals 142 of the bearing assembly 112 and lubricant provided to the second seal lubricant channel 132 via the second lubricant manifold 122 serves to lubricate one or more upper seals 144 of the bearing assembly 112. The seals 142; 144 reside within respective seal pockets 143, 147 and seal directly against a mating and unitary seal surface within an outer face 137 of an inner barrel 148 of the bearing assembly 112, which is in contrast to the prior art approach of the seals engaging replaceable wear sleeves attached to the inner barrel 148. Direct contact of the seal with the inner barrel 148 enhances sealing and heat transfer. Advantageously, the seals 142, 144 can be vertically adjustable for allowing a seal interface between the inner barrel 148 and the seals 142, 144 outer barrel 126 top be adjusted to account for wear on inner barrel seal surface. To ensure adequate delivery of lubricant, vertically spaced apart oil delivery ports 151 can be exposed within the seal pockets 143, 147 and/or spacers 153 with radially-extending fluid communicating passages can be provided within the apart by spacers can be provided within the seal pockets 143, 147 (e.g., between adjacent seals). The inner barrel 148 of the bearing assembly 112 is configured for having a stripper rubber 149 assembly attached to an end portion thereof.

Lubricant provided to the first bearing lubricant channel 132 via the first lubricant manifold 120 serves to lubricate a plurality of bearing units 146 rotatably disposed between the inner barrel 148 of the bearing assembly 112 and the outer barrel 126. The bearing units 146 provide for rotation of the inner barrel 148 relative to the outer barrel 126. Due to the first bearing lubricant channel 132 extending to the bottom portion of the outer barrel 126, lubricant is first provided to bearing units 146 closest to the lower end portion 138 of the outer barrel 126 and lastly to the bearing units 146 closest to the upper end portion 136 of the outer barrel 126. In this manner, the bearing units 146 exposed to a greater amount of heat from the well (i.e., the lower bearing units) are first to receive lubricant from a lubricant supply, thereby aiding in extraction of heat from such bearing units. The second bearing lubricant coupler 122c and the second bearing lubricant passage 122d serve to allow bearing lubricant to be circulated back to the lubricant supply (e.g., for cooling and/or filtration). Thus, a bearing lubricant circuit extends through the first lubricant distribution manifold 120, through the first bearing lubricant channel 130, through the bearing units 146 via a space between the inner barrel 148 and outer barrels 126, through the second bearing lubricant channel 134, and through the second lubricant distribution manifold 122.

Figure 5:
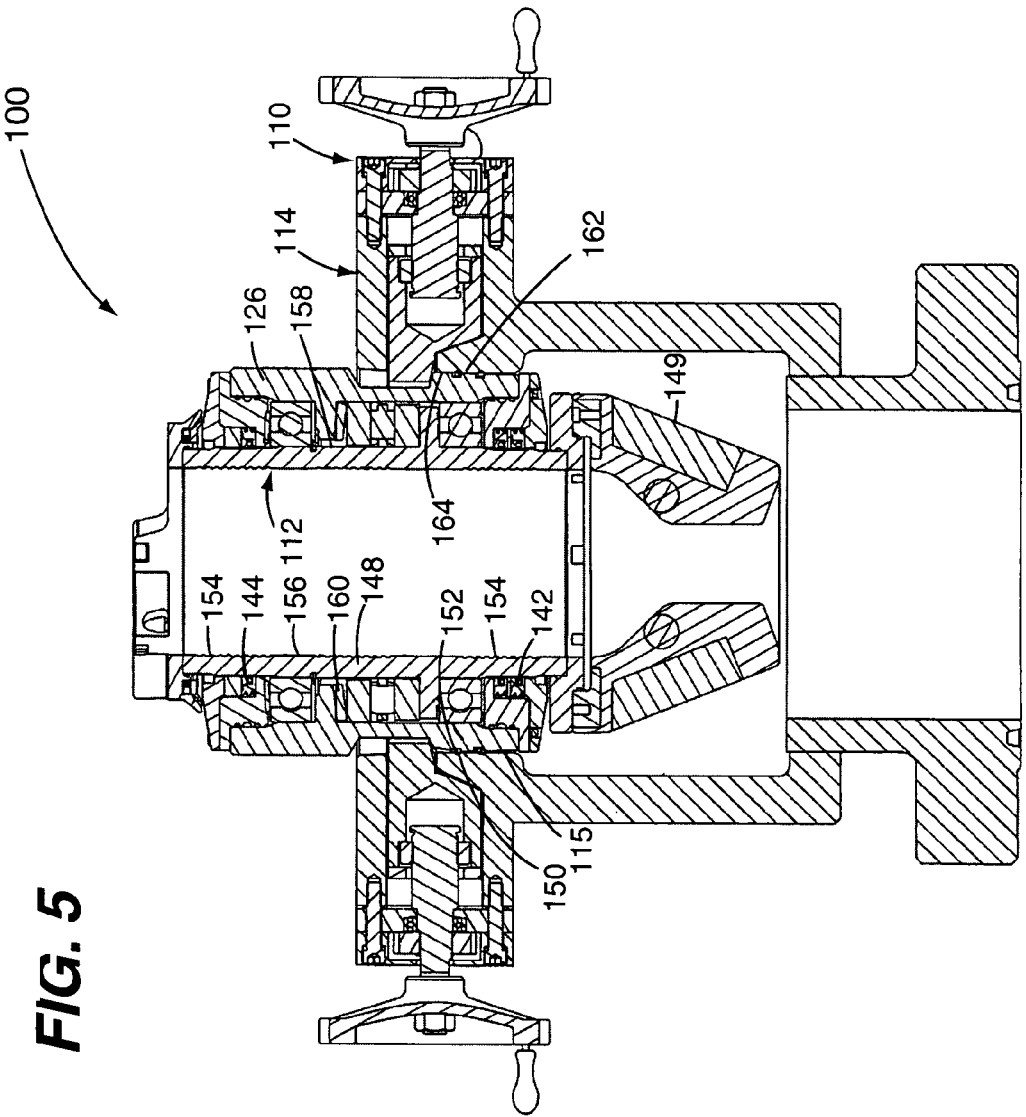
FIG. 5 is a cross-sectional view taken along the line 5-5 in FIG. 4, showing the ram-style bearing assembly retaining apparatus engaged with the bearing assembly.

Referring to FIGS. 5-8, various advantageous, desirable and useful aspects of the bearing assembly 112 are shown. As shown in FIGS. 5 and 6, seals 150 (e.g., O-ring seals) are provided within seal grooves 152 of the outer barrel 126 for providing a sealing interface between mating portions of the outer barrel 126 and the equipment housing 114. As shown in FIG. 5, cooling ribs 154 are provided on an interior face 156 of the inner barrel 148. Preferably, but not necessarily, groups of the cooling ribs 154 are in-line with respective bearing and seal interfaces at an exterior face 158 of the inner barrel 148, thereby enhancing cooling at such interfaces. As shown in FIGS. 5, 7 and 8, a washer-type spring 160 (e.g., a Bellville spring) is engaged between the vertically spaced apart bearings 146 for actively maintaining preloading of such bearings. As best shown in FIGS. 5-8, an exterior face 162 of the outer barrel 126 is tapered (e.g., a 2-4 degree draft). The tapered exterior face 162 engages a mating tapered face 164 (FIG. 5) of the equipment housing 114, thereby providing a self-alignment and tight interface fit between the outer barrel 126 and the equipment housing 114.

Figure 9:
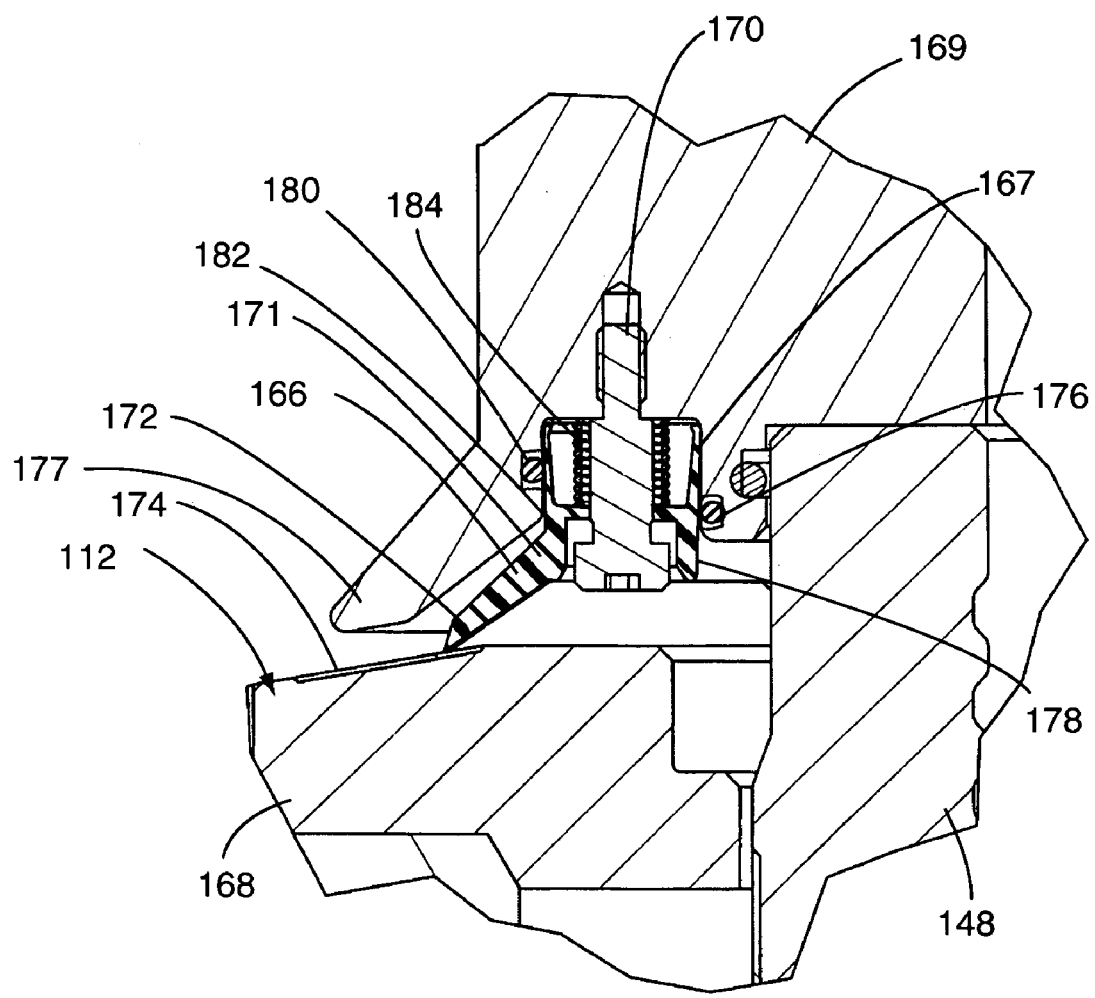
FIG. 9 is a detail view taken from FIG. 8 showing specific aspects of a spring-loaded seal unit in relation to a cover plate and a top drive.

Referring now to FIGS. 6, 8, 9, and 10, bearing assembly 112 includes a spring-loaded seal unit 166 disposed between a cover plate 168 and a top drive 169. The cover plate 168 is fixedly attached to the outer barrel 126 and the top drive 169 is fixedly attached to the inner barrel 148. In one embodiment, as shown, the spring-loaded seal unit 166 is mounted within a circumferential channel 167 (i.e., a groove) of the top drive 169 and is fixedly attached of the top drive 169 with a plurality of threaded fasteners 170. As best shown in FIG. 9, the spring-loaded seal unit 166 includes a seal body 171 having a sealing, lip 172 that engages a seal interface surface 174 of the cover plate 168. As shown, the seal interface surface 174 is a surface of a hardened seal body that is an integral component of the cover plate 168. Alternatively, the seal interface surface 174 can be a non-hardened surface of the cover plate 168 or a surface of a hardened insert within the cover plate 168. Preferably, but not necessarily, the top drive 169 includes a seal shroud 177 that serves to protect the sealing lip 172.

As best shown in FIG. 9, an inner sealing member 176 (e.g., an O-ring) is engaged between an inner face 178 of the spring-loaded seal unit 166 and the top drive 169. An outer sealing member 180 (e.g., an O-ring) is engaged between an outer face 182 of the spring-loaded seal unit 166 and the top drive 169. In this manner, a fluid-resistant seal and/or contaminant-resistant seal is provided between the spring-loaded seal unit 166 and the cover plate 168 as well as between the spring-loaded seal unit 166 and the top drive 169.

Figure 10:
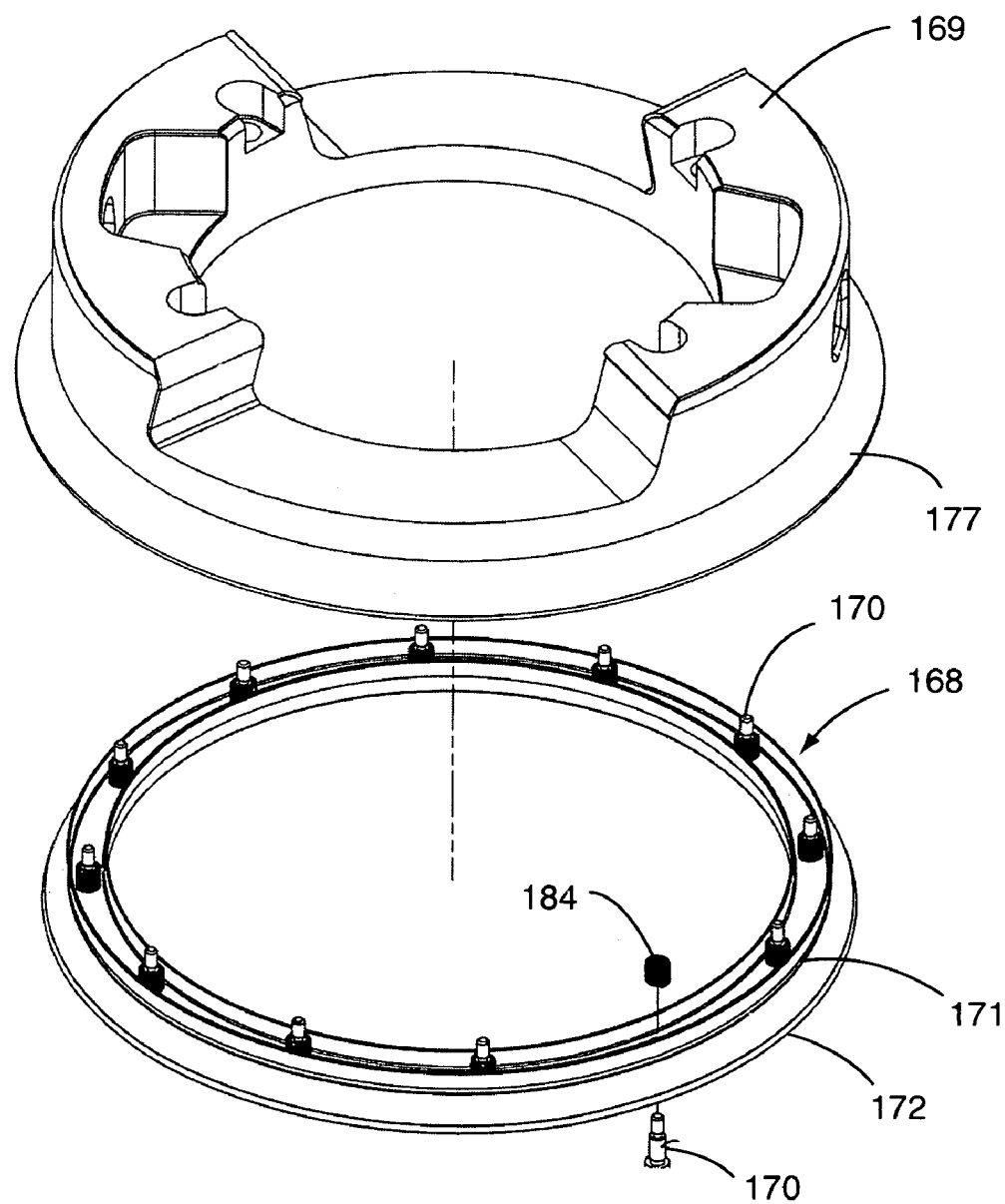
FIG. 10 is a partially exploded view showing the spring-loaded seal detached from the top drive.

As best shown in FIGS. 9 and 10, the seal body 171 is mounted on the top-drive 169 through a plurality of compression springs 184. Each one of the springs 184 has one of the threaded fasteners 170 extending therethrough. In this manner, the top drive 169 is one example of a seal carrying structure. It is disclosed herein that the a spring-loaded seal unit 166 can be carried by any number of different types and configurations of well drilling head components that suitably serve as a seal carrying structure. An ancillary structural component that is in combination with the top dive, inner barrel or the like is another example of a seal carrying structure.

In operation, the springs 184 exert a preload force on the seal body 171. when the sealing lip 172 of the seal body 171 is brought into contact with the cover plate 168. In one embodiment, the seal body 171 is made from a material whereby the entire seal body 171 offers limited resilient (i.e., flexibility) such that sealing is provided via the seal body floating on the springs 184 as opposed to the sealing lip 172 deflecting under force associated with the preload force exerted by the springs 184. Accordingly, a stiffness characteristic of the seal body 171 is such that application of force on the sealing lip 72 results in negligible deformation of the sealing lip and displacement of the entire seal body 171 with respect to the channel 167.

As shown in FIGS. 6-8, it is disclosed herein that an inner barrel in accordance with the present invention may include one or more ancillary discrete components engaged with an outer barrel body. Examples of such ancillary discrete components include, but are not limited to, cover plates (e.g., cover plate 168), spacers (e.g., spacer 173) and the like.

Figure 11:
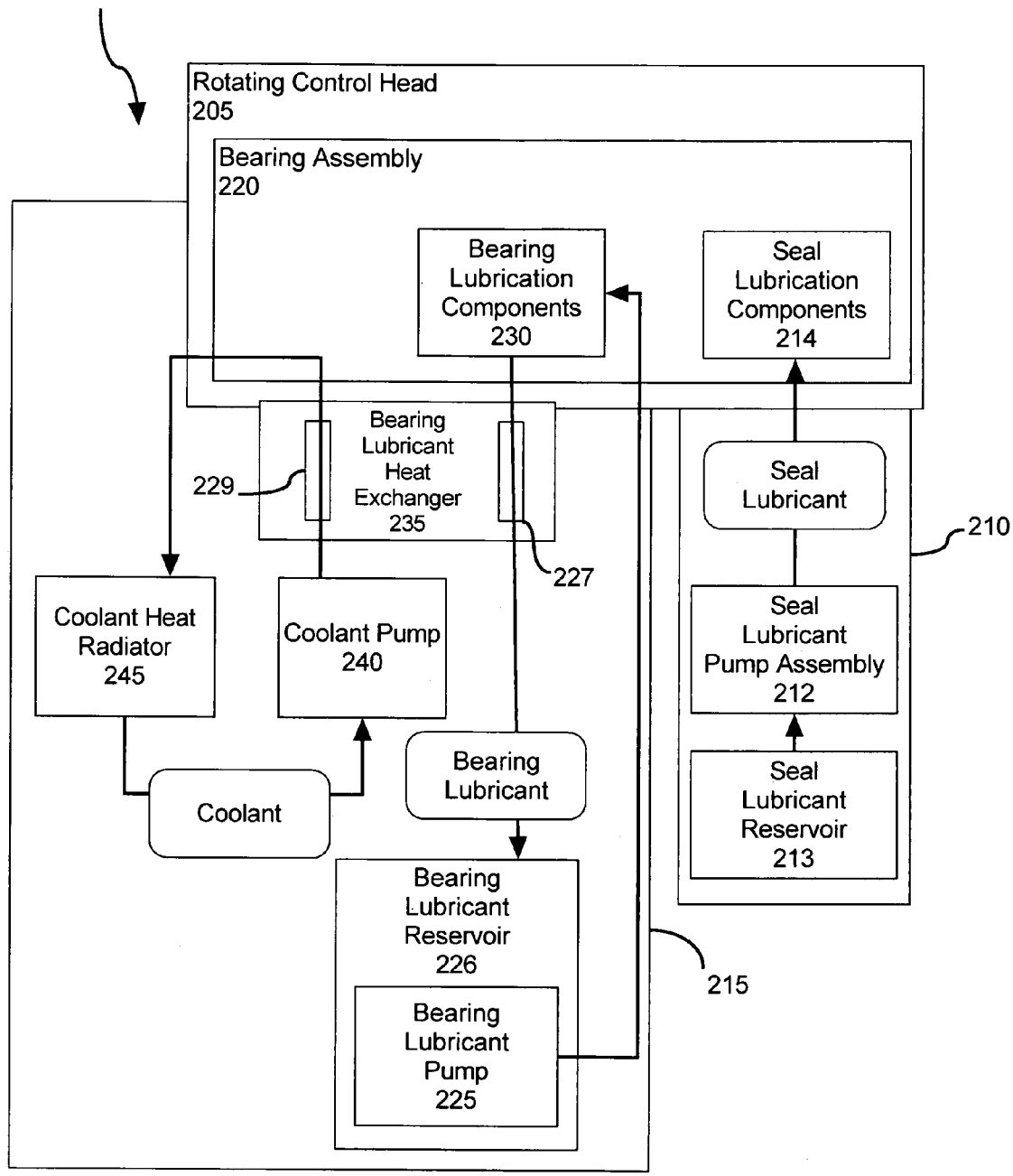
FIG. 11 is a flow chart view showing a rotating control head system in accordance with an embodiment of the present invention, which includes a forced-flow seal lubrication apparatus and a forced-flow bearing lubrication apparatus.

FIG. 11 is a flow chart view that shows a rotating control head system 200 in accordance with an embodiment of the present invention. The rotating control head system 200 includes rotating control head 205 with integrated forced-flow seal lubrication apparatus 210 and integrated forced-flow bearing lubrication apparatus 215. The forced-flow seal lubrication apparatus 210 facilitates delivery of seal lubricant to various seals of a bearing assembly 220 of the rotating control head 205. The forced-flow bearing lubrication apparatus 215 facilitates circulation of bearing lubricant through various bearings of the bearing assembly 220 of the rotating control head 205 and cooling of the circulated bearing lubricant.

The forced-flow seal lubrication apparatus 210 includes a seal lubricant pump 212, a seal lubricant reservoir 213, and seal lubrication components 214. The seal lubricant pump 212 extracts lubricant from the seal lubricant reservoir 213, and provides such extracted lubricant to one or more seals of the bearing assembly 220 through the seal lubrication components 214. In one embodiment, the rotating control head 205 is embodied by the rotating control head 100 shown in FIG. 4. In such an embodiment, the seal lubrication components 214 are comprised by various components of the rotating control head 100, which include the first seal lubricant coupler 120a, the second seal lubricant coupler 122a, the first seal lubricant passage 120b, the second seal lubricant passage 122b, the first seal lubricant channel 128 and the second seal lubricant channel 130. Accordingly, in such an embodiment, seal lubricant is routed to the respective seals through the respective seal lubricant coupler (120a, 122a), through the respective seal lubricant passage (120b, 122b), and to one or more seals through the respective seal lubricant channel (128, 130).

The forced-flow bearing lubrication apparatus 215 includes a bearing lubricant pump 225, a lubricant reservoir 226, bearing lubricant components 230, a bearing lubricant heat exchanger 235, a coolant pump 240, and a coolant radiator 245. A bearing lubrication flow circuit is defined by bearing lubricant flowing from lubricant reservoir 226 via the bearing lubricant pump 225, which resides within the lubricant reservoir 226, through the bearing lubricant components 230, through a lubricate core portion 227 of the bearing lubricant heat exchanger 235, and back into the bearing lubricant reservoir 226. A coolant flow circuit is defined by coolant flowing from the coolant pump 240, through a coolant core portion 229 of the bearing lubricant heat exchanger 235 to the coolant radiator 245. The lubricate core and coolant core portions (227, 229) of the bearing lubricant heat exchanger 235 allow for the independent flow of lubricant and coolant and for heat from the coolant to be transferred to the coolant. Accordingly, the bearing lubricant heat exchanger 235 is preferably, but not necessarily, a liquid-to-liquid heat exchanger. The coolant radiator 245 is preferably, but not necessarily, of the liquid-to-air type.

The bearing lubricant pump 225 provides bearing lubricant to the bearing lubricant components 230, with such bearing lubricant being routed back to the lubricant pump 225 through the lubricate core portion 227 of the bearing lubricant heat exchanger 235. The coolant pump 240 provides coolant to the coolant radiator 245 through the coolant core portion 229. In one embodiment, the rotating control head 205 is embodied by the rotating control head 100 shown in FIG. 4. In such an embodiment, the bearing lubrication components 230 are comprised by various components of the rotating control head 100, which include the first bearing lubricant coupler 120c, the second bearing lubricant coupler 122c, the first bearing lubricant passage 120d, the second bearing lubricant passage 122d, the first bearing lubricant channel 132 and the second bearing lubricant channel 134. Accordingly, in such an embodiment, bearing lubricant is routed to the respective bearings through the respective bearing lubricant coupler (120c, 122c), through the respective bearing lubricant passage (120d, 122d), and to one or more bearings through the respective bearing lubricant channel (132, 134).

It is disclosed herein that the seal lubricant 212, the seal lubricant reservoir 213, the bearing lubricant pump 225, the coolant pump 240 and the coolant reservoir 245 can be mounted on the equipment body 114 of the rotating control head 100. In such an embodiment, elongated hoses or pipes extend between the bearing lubricant heat exchanger 235 and the coolant radiator 245. Alternatively, the coolant pump 240, lubricant pump 225 and/or the heat exchanger 235 can be remotely located from the rotating control head 100.

Figure 12:
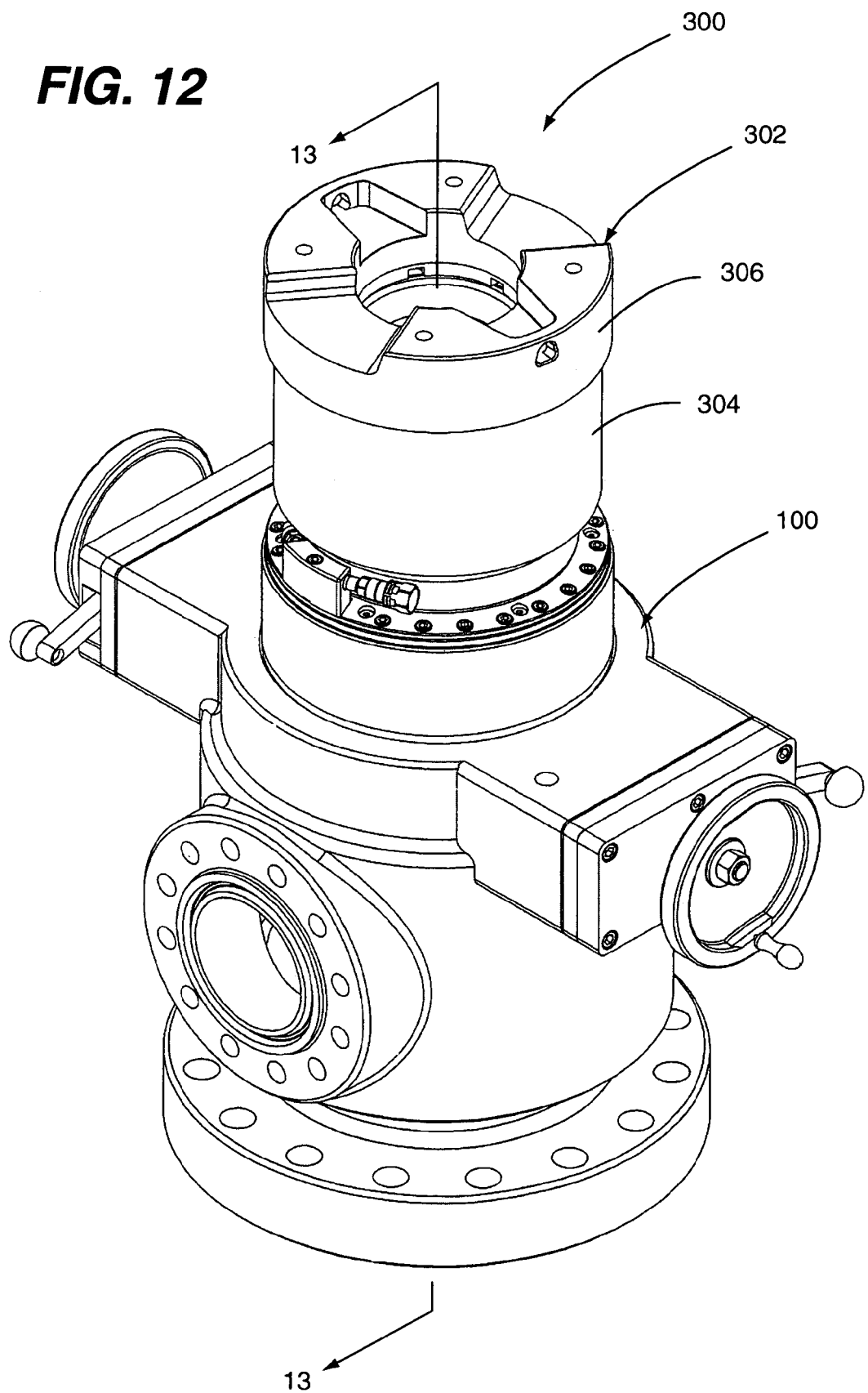
FIG. 12 is a perspective view of a rotating control head in accordance with a third embodiment of the present invention, wherein the rotating control head is a high pressure rotating control head with a ram style bearing assembly retaining apparatus.
Figure 13:
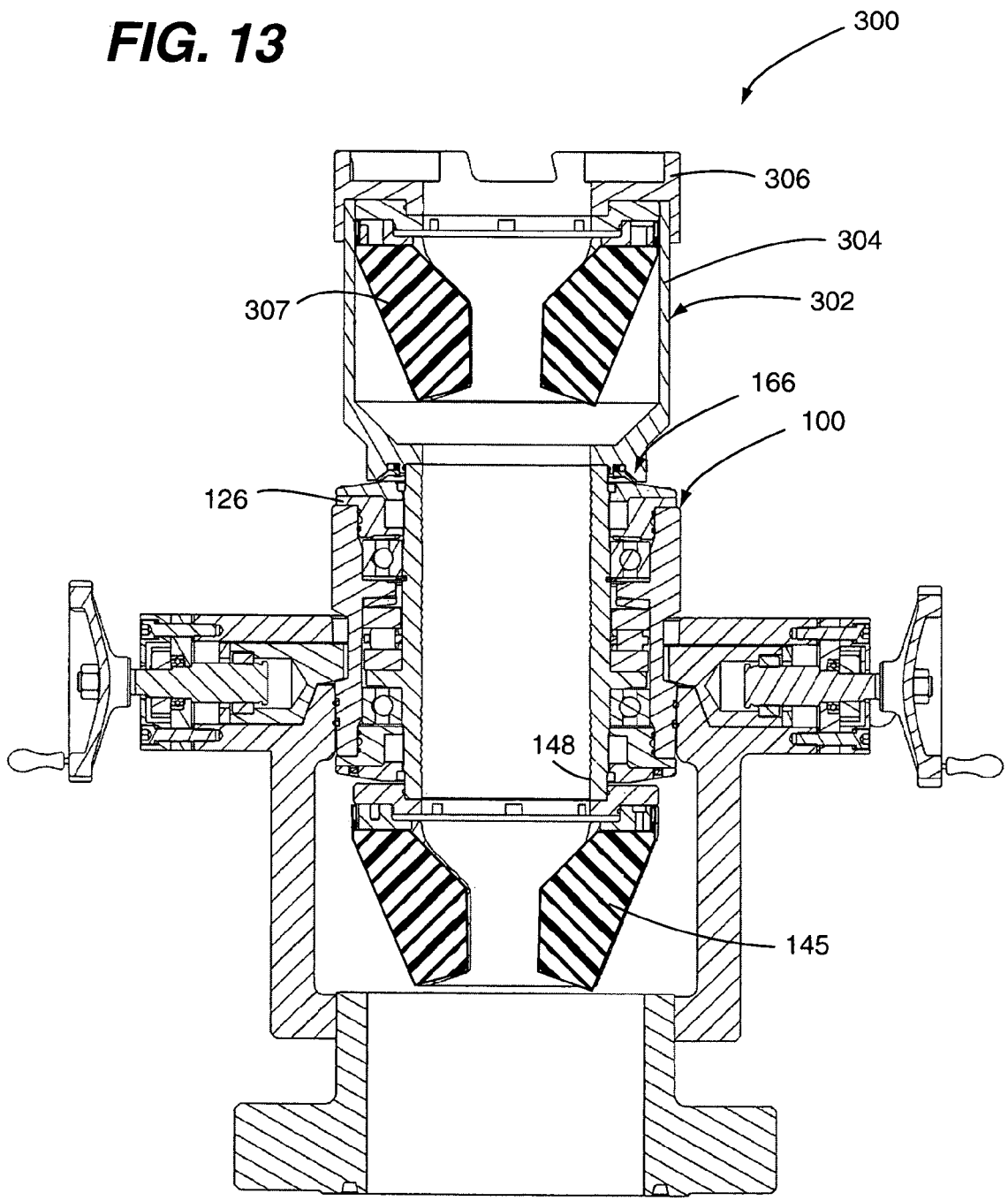
FIG. 13 is a cross-sectional view taken along the line 13-13 in FIG. 12.

Turning now to a brief discussion on high pressure rotating control heads in accordance with embodiments of the present invention, such a high pressure rotating control head 300 is shown in FIGS. 12 and 13. The high pressure rotating control head 300 comprises an upper stripper rubber apparatus 302 mounted on the low pressure rotating control head 100 of FIGS. 4-12 in a manner whereby the upper stripper rubber apparatus 302 is mounted in place of the top drive 169. A canister body 304 of the upper stripper rubber apparatus 302 carries the spring-loaded seal unit 166. The spring-loaded seal unit 166 is engaged between the canister body 304 and the cover plate 168 in the same manner is it is between the top drive 169 and cover plate 168 in the low pressure rotating control head 100. The canister body 304 is attached to the outer barrel 126 in a manner whereby rotation of the canister body 304 with respect to the outer barrel 126 is substantially precluded and whereby vertical displacement during use is substantially precluded.

A top driver cover 306 (i.e., also referred to herein as a canister body lid) of the upper stripper rubber apparatus 302 is configured for having a stripper rubber assembly 307 operably and fixedly attached thereto. In this manner, the high pressure rotating control head 300 is configured for having spaced apart stripper rubber assemblies (i.e., stripper rubber assemblies 145, 307) attached thereto. A first one of such spaced apart stripper rubber assemblies (i.e., stripper rubber assembly 145) is fixedly attached to an end portion of the inner barrel 148 and a second one of such spaced apart stripper rubber assemblies (i.e., stripper rubber assembly 307) is fixedly attached to the top driver cover 306.

The top driver cover 306 can be engaged with the canister body 304 through any number of different types of interconnection approaches. Mechanical fasteners such as screws, pins and the like are an example of such possible interconnection approaches. The objective of such interconnection is to secure the top driver cover 306 and canister body 304 to each other in a manner than precludes relative rotation and vertical separation therebetween.

Figure 14:
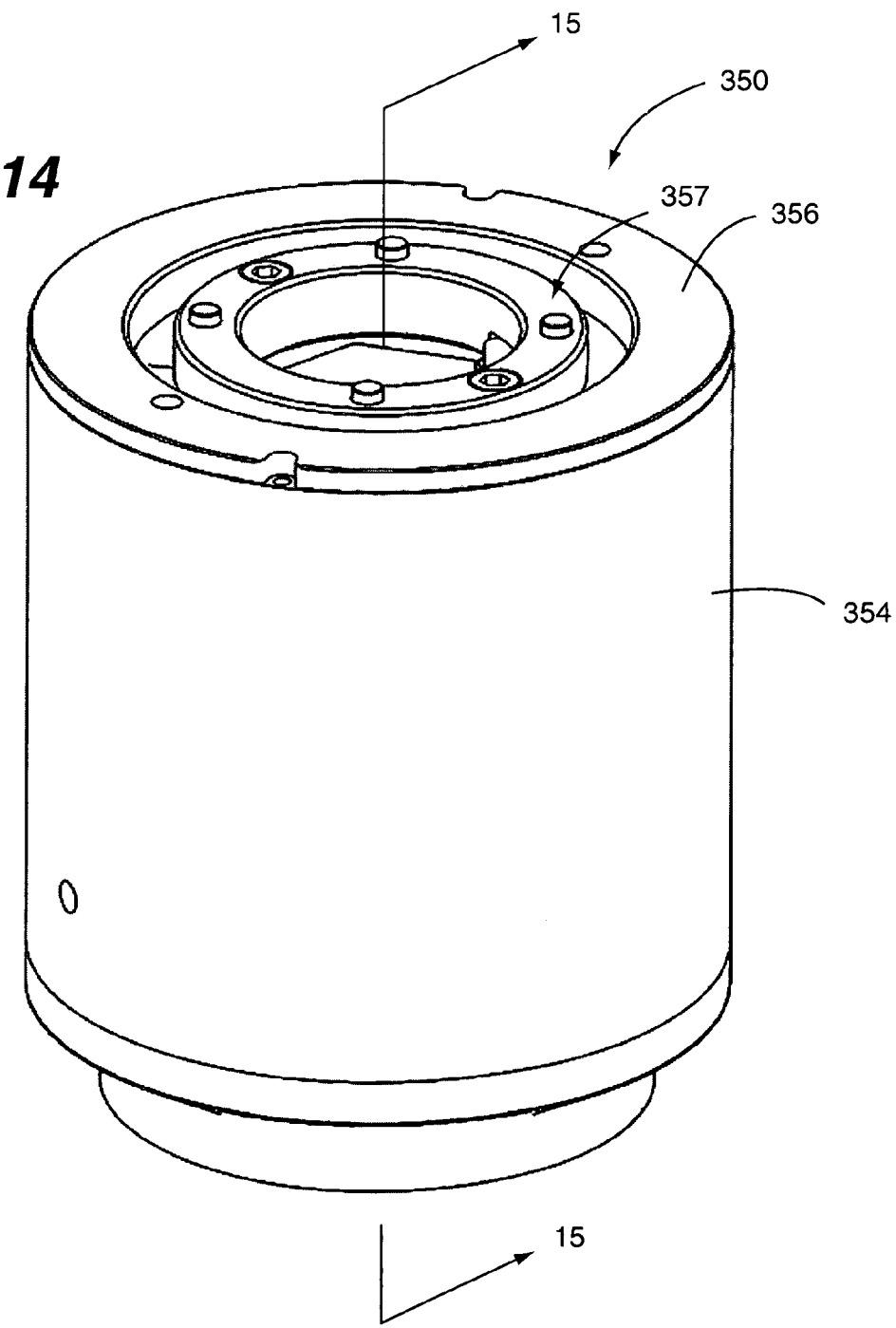
FIG. 14 is a perspective view showing an embodiment of an upper stripper rubber apparatus using a bayonet style interconnection between the canister body thereof and canister body lid thereof.
Figure 15:
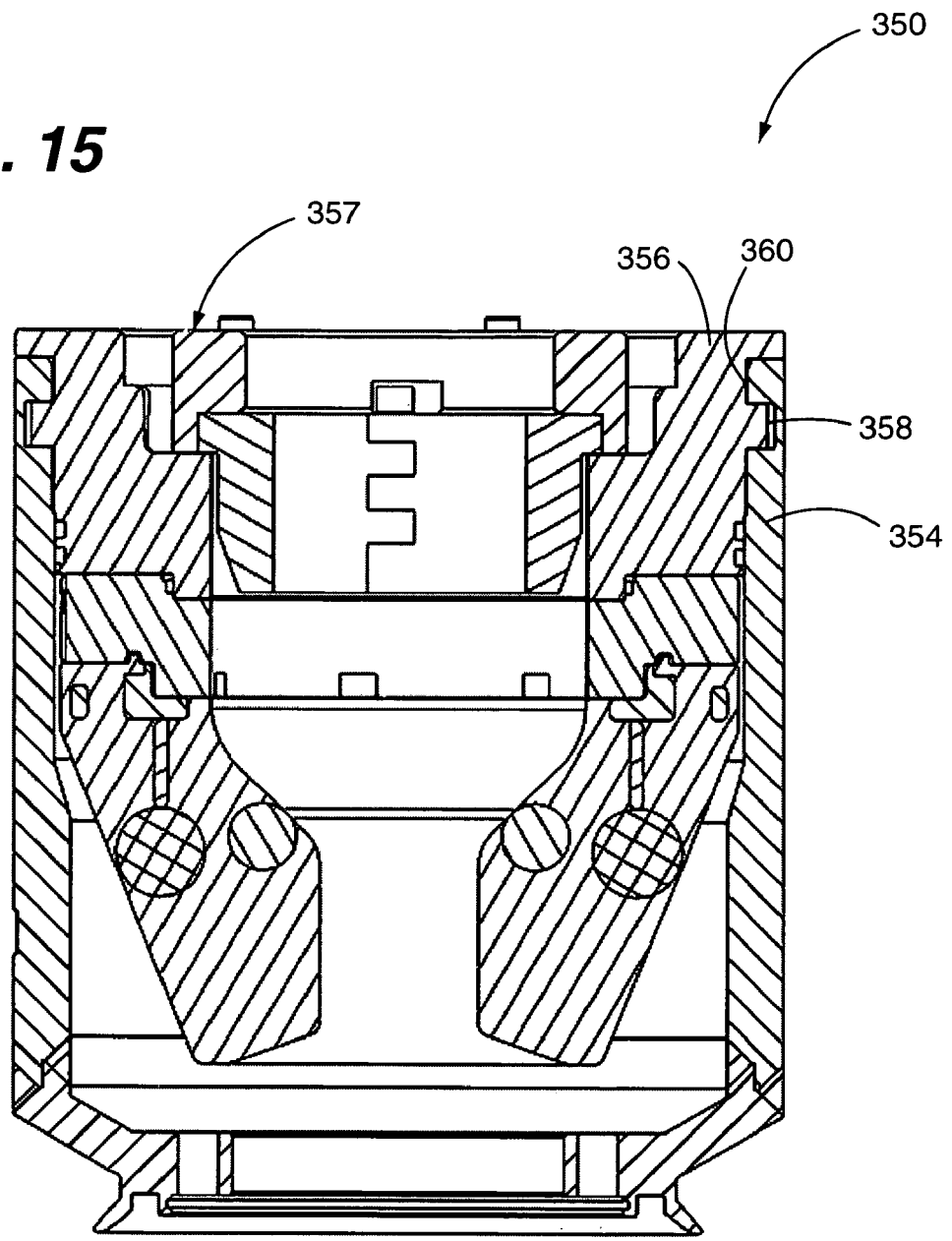
FIG. 15 is a cross-sectional view taken along the line 15-15 in FIG. 14.
Figure 16:
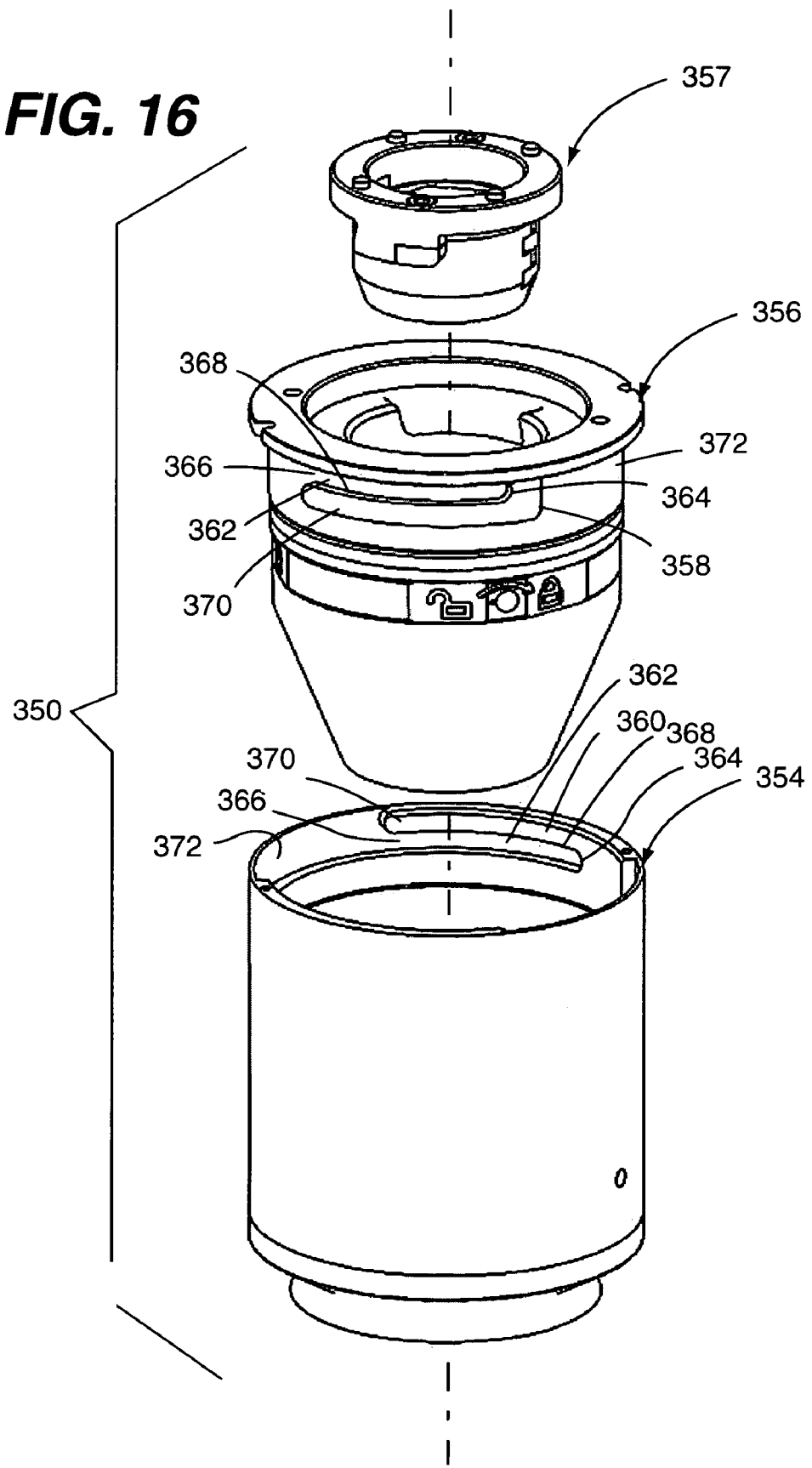
FIG. 16 is an exploded perspective view of the upper stripper rubber apparatus shown in FIG. 14.

A bayonet style interconnection is a preferred embodiment for interconnecting a top driver cover and a canister body. FIGS. 14-16 show an embodiment of the upper stripper rubber apparatus 350 including a canister body 354, a canister body lid 356 (i.e., top driver cover) and a kelly driver 357. The upper stripper rubber apparatus 350 includes a bayonet style interconnection between the canister body lid 356 and the canister body 354. The upper stripper rubber apparatus 350 shown in FIGS. 14-16 and the upper stripper rubber apparatus 302 shown in FIGS. 12 and 13 are interchangeable with respect to a given high pressure rotating control head.

Still referring to FIGS. 14-16, the canister body lid 356 includes one or more bayonet interconnect structures 358 and the canister body 354 includes one or more mating bayonet style interconnect structures 360. Each bayonet connector structure 358, 360 includes an engagement groove 362 having a closed end portion 364 and an open end portion 366. An elongated edge portion 368 of the engagement groove 362 is defined by an elongated raised rib member 370 extending at least partially along the engagement groove 362. A space 372 at least as long as one of the canister body lid bayonet connector structures 358 is provided between adjacent ones of the canister body bayonet connector structures 360 and a space 372 at least as long as one of the canister body bayonet connector structures 360 is provided between adjacent ones of the canister body lid bayonet connector structures 358. Preferably, but not necessarily, all of the canister body lid bayonet connector structures 358 are substantially the same length and all of the canister body bayonet connector structures 360 are substantially the same length.

Accordingly, the engagement groove 362 of each canister body bayonet connector structure 360 and the rib member 370 of each canister body lid bayonet connector structure 358 are jointly configured for allowing the rib member 370 of each canister body lid bayonet connector structure 358 to be slideably received within the engagement groove 362 of a respective one of the canister body bayonet connector structures 360 through relative rotation between the canister body 354 and the canister body lid 356 when the canister body 354 and the canister body lid 356 are in a mated orientation such that the rib member 370 of each canister body lid bayonet connector structure 358 is aligned with the engagement groove 362 of the respective one of the canister body bayonet connector structures 360. Similarly, the engagement groove 362 of each one of the canister body lid bayonet connector structures 358 and the rib member 370 of each one of the canister body bayonet connector structures 360 are jointly configured for allowing the rib member 370 of each canister body bayonet connector structures 360 to be slideably received within the engagement groove 362 of a respective one of the canister body lid bayonet connector structures 358 through relative rotation between the canister body 354 and the canister body lid 356 when the canister body 354 and the canister body lid 356 are in the mated orientation.

The bayonet interconnect structures are engage by vertically lowering the top driver cover 306 into place on the canister body 304 with the rib members 370 and spaces 372 aligned accordingly, and then rotating the top driver cover 306 a fraction of a turn with respect to the canister body 304 for securing the top driver cover 306 to the canister body 304. Preferably, the direction of locking rotation of the top driver cover 306 with respect to the canister body 304 is the same direction as the kelly rotational direction, thereby ensuring that the top driver cover 306 remains in an interconnected orientation with respect to the canister body 304 during operation of the rotating control head and key driver. Optionally, one or more locking devices can be engaged between the canister body 356 and the canister body lid 356 for maintaining the canister body 354 and the canister body lid 356 in an interlocked configuration.

Turning now to data acquisition, it is disclosed herein that respective portions of a data acquisition apparatus can be integrated into a rotating control head in accordance with an embodiment of the present invention. Such data acquisition is valuable in assessing operation of the rotating control head. More specifically, such a data acquisition apparatus facilitates monitoring, capturing, analysing and/or transmitting of data relating to rotating head operation. Examples of rotating head operation include, but are not limited to, well pressure, time in use, max pressure seen, number of drill string pipes installed, amount of downtime for a given reference time, number of bearing assembly rotations, number of critical conditions experienced, and the like. Acquired data is preferably sent from the data acquisition apparatus to a data management system (e.g., a computer having network access) via a wireless manner.

Figure 17:
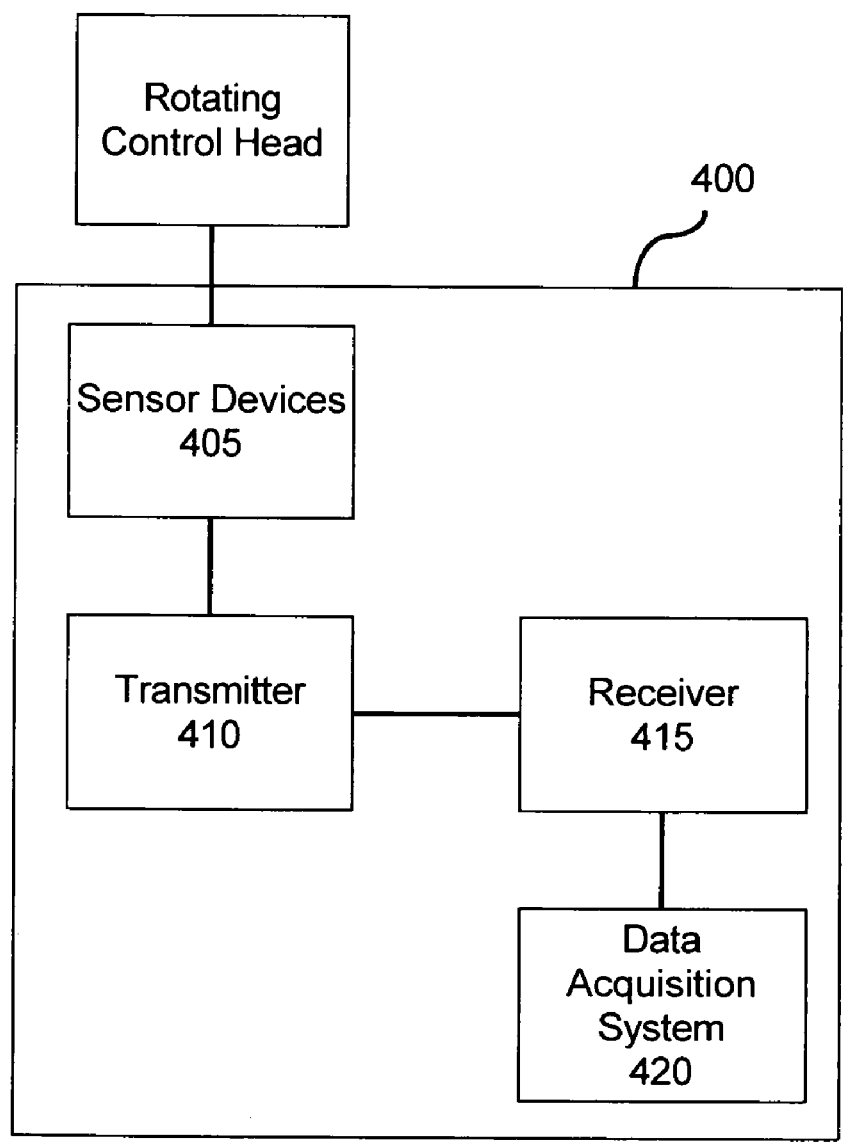
FIG. 17 is a diagrammatic view of a data acquisition apparatus in accordance with an embodiment of the present invention.

As shown in FIG. 17, in one embodiment, a data acquisition apparatus 400 in accordance with the present invention includes sensor devices 405, (e.g., transducers, probes, thermal couples, etc), a transmitter 410, a receiver 415, and a data acquisition system 420. The data acquisition apparatus 400 is coupled to a rotating control head (e.g., the rotating control head 100 disclosed herein) through the sensor devices 405. Operational information of the rotating control head is gathered by the sensor devices 405 and is transmitted to the data acquisition system 420 via the transmitter 410 and the receiver 415. The transmitter 410 and the receiver 415 can be any type of units suitably configured for transmitting signal over wire, wirelessly, over a computer network, via satellites, etc. The data acquisition system 420 is configured for storing, monitoring and/or analyzing information received from the sensor devices 405. Thus, such information can be stored, monitored and/or analyzed at a remote location from the rotating control head.

Figure 18:
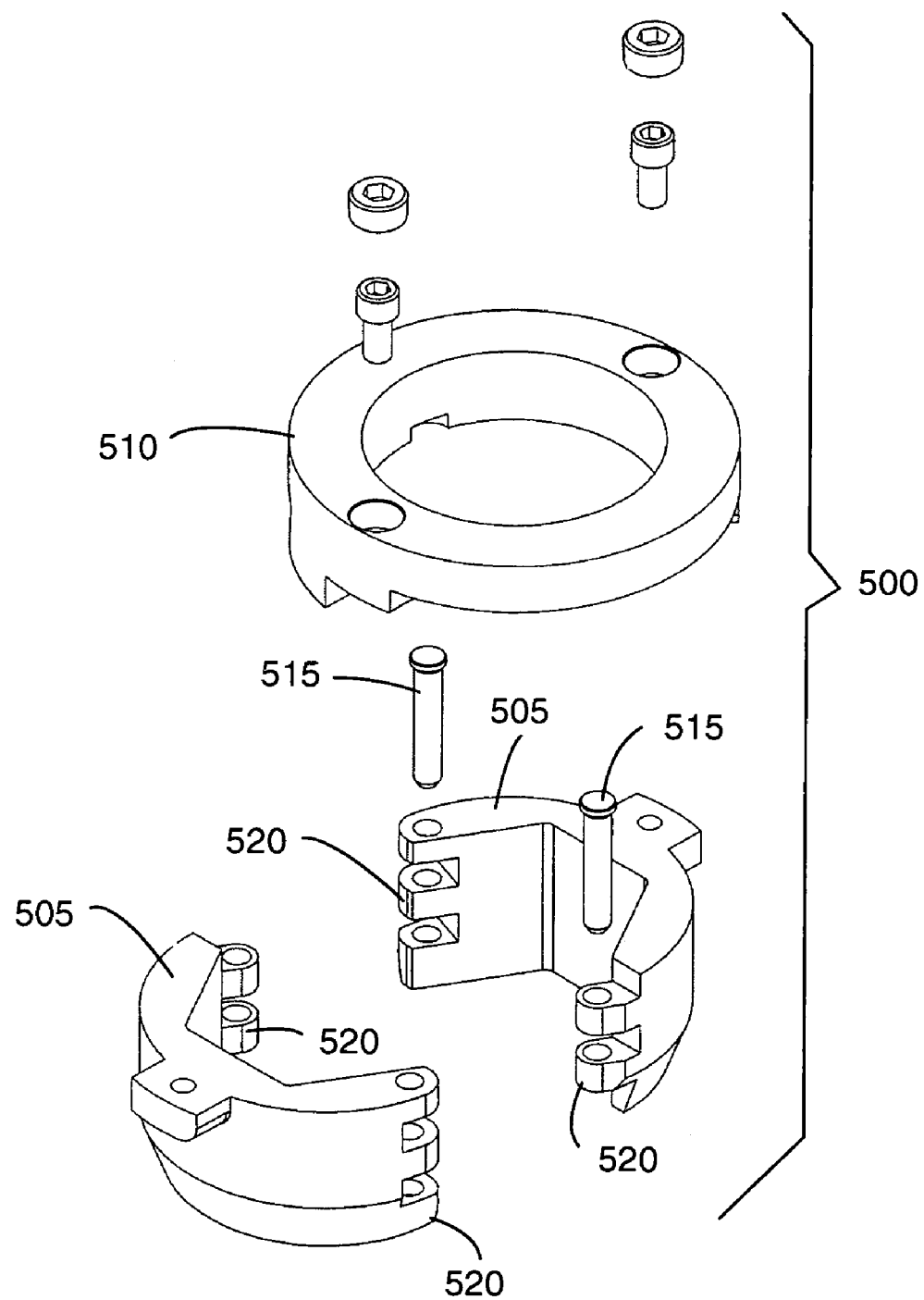
FIG. 18 is a perspective view showing a kelly driver in accordance with an embodiment of the present invention.

Turning now to a discussion of related equipment used with rotating control heads in accordance with the present invention, a kelly driver is oil field equipment that facilitates applying a rotational torque to a segment of drill string pipe. FIG. 18 shows and embodiment of a kelly driver 500 in accordance with an embodiment of the present invention. The kelly driver 500 includes hinged split bushings 505, a top ring 510, and connection pins 515. The split bushings 505 each include spaced apart hinge members 520. The spaced apart hinge members 520 are configured for and orientated for being aligned and interlocked with connection pins 512. In this manner, the hinge members 520 can be readily and rapidly engaged with and removed from the associated drill string pipe.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A bearing assembly cooling system, comprising:
   a bearing assembly including an outer barrel having a central bore extending between upper and lower end portions thereof, an inner barrel at least partially disposed within the central bore of the outer barrel and bearings coupled between said barrels for providing concentric alignment of said barrels and allowing rotation therebetween, wherein the bearing assembly includes a first lubricant channel that extends within the outer barrel of the barrel assembly and includes a second lubricant channel defined between the outer barrel and the inner barrel of the bearing assembly, wherein said bearings are exposed within the second lubricant channel defined between the outer barrel and the inner barrel, wherein said lubricant channels intersect, wherein the outer barrel includes a bearing assembly retention groove within an exterior surface thereof, wherein a key portion extends across the bearing assembly retention groove, and wherein the first lubricant channel within the outer barrel extends through the key portion;
   a heat exchanger having a lubricant core portion and a coolant core portion, wherein said core portions are jointly configured for allowing heat transfer between respective fluids of said core portions;
   a coolant flow circuit apparatus coupled to the coolant core portion, wherein the coolant flow circuit apparatus is configured for circulating coolant through the coolant core portion; and
   a lubricant flow circuit apparatus coupled to the lubricant core portion and to said lubricant channels, wherein the lubricant flow circuit apparatus is configured for circulating lubricant through the lubricant core portion and said lubricant channels.

2. The bearing assembly cooling system of claim 1 wherein:
   the coolant flow circuit apparatus includes a coolant pump and a heat dissipation device; and
   the coolant pump, heat dissipation device and the coolant core portion are interconnected for allowing the coolant pump to cause said coolant to flow through the heat dissipation device after flowing through the coolant core portion.

3. The bearing assembly cooling system of claim 1 wherein:
   the first lubricant channel within the outer barrel extends to a lower end portion of the outer barrel and intersects with the second lubricant channel defined between the outer barrel and the inner barrel at a location adjacent the lower end portion of the outer barrel;
   the lubricant flow circuit apparatus includes a lubricant pump coupled to said channels for causing said lubricant to flow through said channels;
   a lubricant outlet of the lubricant pump is coupled to the first lubricant channel within the outer barrel; and
   a lubricant inlet of the lubricant pump is coupled to the second lubricant channel defined between said barrels.

4. The bearing assembly cooling system of claim 3 wherein:
   the coolant flow circuit apparatus includes a coolant pump and a heat dissipation device; and
   the coolant pump, heat dissipation device and the coolant core portion are interconnected for allowing the coolant pump to cause said coolant to flow through the heat dissipation device after flowing through the coolant core portion.

5. The bearing assembly cooling system of claim 1 wherein:
   the lubricant flow circuit apparatus includes a lubricant pump, a first lubricant manifold mounted on the bearing assembly and a second lubricant manifold mounted on the bearing assembly;
   the first lubricant manifold includes a lubricant passage coupled to the first lubricant channel within the outer barrel;
   the second lubricant manifold includes a lubricant passage coupled to the second lubricant channel defined between the outer barrel and the inner barrel; and
   the lubricant pump is coupled to said channels for causing said lubricant to flow through said channels.

6. The bearing assembly cooling system of claim 5 wherein:
   the first lubricant channel within the outer barrel extends to a lower end portion of the outer barrel and intersects with the second lubricant channel defined between the outer barrel and the inner barrel at a location adjacent the lower end portion of the outer barrel;
   a lubricant outlet of the lubricant pump is coupled to the lubricant passage of the first lubricant manifold;
   a lubricant inlet of the lubricant pump is coupled to the lubricant passage of the second lubricant manifold;
   the coolant flow circuit apparatus includes a coolant pump and a heat dissipation device; and
   the coolant pump, heat dissipation device and the coolant core portion are interconnected for allowing the coolant pump to cause said coolant to flow through the heat dissipation device after flowing through the coolant core portion.

7. The bearing assembly cooling system of claim 1 wherein:
   the exterior surface of the outer barrel is configured for being engaged with a mating interior surface of a rotating control device housing; and
   a stripper rubber attachment structure is integral with a lower end portion of the inner barrel.

8. A rotating control device system, comprising:
a rotating control device housing having a sidewall structure defining a central bore;
a bearing assembly removably seated within the central bore of the rotating control device housing, wherein the bearing assembly includes a plurality of bearings, a first lubricant channel that extends within an outer barrel of the bearing assembly, and a second lubricant channel defined between the outer barrel and an inner barrel of the bearing assembly, wherein said bearings are exposed within the second lubricant channel defined between the outer barrel and the inner barrel, wherein said lubricant channels intersect, wherein the outer barrel includes a bearing assembly retention groove within an exterior surface thereof, wherein a key portion extends across the bearing assembly retention groove, and wherein the first lubricant channel within the outer barrel extends through the key portion; and
a lubricant flow circuit apparatus coupled to said lubricant channels and to a heat exchanger for circulating lubricant therethrough.

9. The rotating control device system of claim 8, further comprising:
a coolant flow circuit apparatus including a coolant pump and a heat dissipation device coupled to the heat exchanger, wherein the coolant pump causes coolant to flow through the heat dissipation device after flowing through the heat exchanger.

10. The rotating control device system of claim 8 wherein:
the first lubricant channel within the outer barrel extends to a lower end portion of the outer barrel and intersects with the second lubricant channel defined between the outer barrel and the inner barrel at only a location adjacent the lower end portion of the outer barrel.

11. The rotating control device system of claim 8 wherein:
the lubricant flow circuit apparatus includes a lubricant pump, a first lubricant manifold mounted on the bearing assembly and a second lubricant manifold mounted on the bearing assembly;
the first lubricant manifold includes a lubricant passage coupled to the first lubricant channel within the outer barrel;
the second lubricant manifold includes a lubricant passage coupled to the second lubricant channel defined between the outer barrel and the inner barrel; and
the lubricant pump is coupled to said channels for causing said lubricant to flow through said channels.

12. The rotating control device system of claim 11 wherein:
the first lubricant channel within the outer barrel extends to a lower end portion of the outer barrel and intersects with the second lubricant channel defined between the outer barrel and the inner barrel at only a location adjacent the lower end portion of the outer barrel;
a lubricant outlet of the lubricant pump is coupled to the lubricant passage of the first lubricant manifold; and
a lubricant inlet of the lubricant pump is coupled to the lubricant passage of the second lubricant manifold.

13. The rotating control device system of claim 8 wherein a stripper rubber attachment structure is integral with a lower end portion of the inner barrel.

14. The rotating control device system of claim 8 wherein:
the outer barrel is generally cylindrical shaped; and
the bearing assembly retention groove extends partially around a circumference of the outer barrel.

15. A method, comprising: providing a rotating control device with a bearing assembly including an outer barrel having a central bore extending between upper and lower end portions thereof, an inner barrel at least partially disposed within the central bore of the outer barrel and bearings coupled between said barrels for providing concentric alignment of said barrels and allowing rotation therebetween, wherein the bearing assembly includes a first lubricant channel that extends within the outer barrel of the bearing assembly and includes a second lubricant channel defined between the outer barrel and the inner barrel of the bearing assembly, wherein said bearings are exposed within the second lubricant channel defined between the outer barrel and the inner barrel, wherein said lubricant channels intersect, wherein the outer barrel includes a bearing assembly retention groove within an exterior surface thereof, wherein a key portion extends across the bearing assembly retention groove, and wherein the first lubricant channel within the outer barrel extends through the key portion; circulating coolant through a coolant flow circuit of a heat exchanger system, wherein circulating said coolant includes causing said coolant to flow from a coolant pump through a coolant core portion of a heat exchanger and through a heat dissipating device after flowing through the coolant core portion of the heat exchanger; and circulating lubricant through a lubricant flow circuit of the heat exchanger system, wherein circulating said lubricant includes causing said lubricant to flow from a lubricant pump through said lubricant channels and through a lubricate core portion of the heat exchanger after flowing through said lubricant channels.

16. The method of claim 15 wherein: the first lubricant channel within the outer barrel extends to a lower end portion of the outer barrel and intersects with the second lubricant channel defined between the outer barrel and the inner barrel at a location adjacent the lower end portion of the outer barrel; a lubricant outlet of the lubricant pump is coupled to the first lubricant channel within the outer barrel; and a lubricant inlet of the lubricant pump is coupled to the second lubricant channel defined between said barrels.

17. The method of claim 16 wherein the first lubricant channel within the outer barrel extends to a lower end portion of the outer barrel and intersects with the second lubricant channel defined between the outer barrel and the inner barrel at only the location adjacent the lower end portion of the outer barrel.

18. The method of claim 15 wherein: an exterior surface of the outer barrel is configured for being engaged with a mating interior surface of a rotating control device housing; and a stripper rubber attachment structure is integral with a lower end portion of the inner barrel.

* * * * *